(12) United States Patent
Li et al.

(10) Patent No.: US 12,331,496 B2
(45) Date of Patent: Jun. 17, 2025

(54) UNIVERSAL ROUGH-IN VALVE MANIFOLD

(71) Applicant: AS America, Inc., Piscataway, NJ (US)

(72) Inventors: Hsiao Chang Li, Edison, NJ (US); Walter Pitsch, Washington, NJ (US)

(73) Assignee: AS America, Inc., Piscataway, NJ (US)

( * ) Notice: Subject to any disclaimer, the term of this patent is extended or adjusted under 35 U.S.C. 154(b) by 0 days.

(21) Appl. No.: 18/137,894

(22) Filed: Apr. 21, 2023

(65) Prior Publication Data

US 2023/0257973 A1 Aug. 17, 2023

Related U.S. Application Data

(63) Continuation of application No. 17/527,893, filed on Nov. 16, 2021, now Pat. No. 11,655,619, which is a continuation of application No. 16/756,776, filed as application No. PCT/US2018/057014 on Oct. 23, 2018, now Pat. No. 11,203,856.

(60) Provisional application No. 62/575,815, filed on Oct. 23, 2017.

(51) Int. Cl.
| | |
|---|---|
| *E03C 1/02* | (2006.01) |
| *F16K 27/04* | (2006.01) |
| *E03C 1/042* | (2006.01) |

(52) U.S. Cl.
CPC ............ *E03C 1/021* (2013.01); *F16K 27/045* (2013.01); *E03C 1/042* (2013.01); *E03C 2201/50* (2013.01)

(58) Field of Classification Search
CPC ........... F16K 11/22; E03C 1/021; E03C 1/042
See application file for complete search history.

(56) References Cited

U.S. PATENT DOCUMENTS

| | | | | |
|---|---|---|---|---|
| 6,378,911 B1* | 4/2002 | Grohe | ..................... | E03C 1/021 |
| | | | | 285/125.1 |
| 8,235,353 B2* | 8/2012 | Miyagi | .................... | F16K 21/12 |
| | | | | 251/28 |
| 11,808,019 B2* | 11/2023 | Li | ......................... | F16K 27/003 |
| 2007/0056639 A1* | 3/2007 | McNerney | ............ | E03C 1/0408 |
| | | | | 137/597 |
| 2010/0212759 A1* | 8/2010 | DeVries | ..................... | E03C 1/02 |
| | | | | 137/597 |
| 2014/0261779 A1* | 9/2014 | Niver | .................... | F16K 11/074 |
| | | | | 366/340 |
| 2014/0261808 A1* | 9/2014 | Brouwer | ............... | F16K 39/024 |
| | | | | 251/366 |
| 2014/0261813 A1* | 9/2014 | Brouwer | ................. | F16K 11/00 |
| | | | | 137/625.46 |
| 2015/0308086 A1* | 10/2015 | Feng | ....................... | E03C 1/042 |
| | | | | 4/678 |

\* cited by examiner

*Primary Examiner* — Reinaldo Sanchez-Medina
(74) *Attorney, Agent, or Firm* — Anna-Lisa L. Gallo; Tyler A. Stevenson

(57) ABSTRACT

A universal rough-in valve (20) includes a valve chamber (34) configured to receive a valve manifold (72). The universal rough-in valve includes a first valve inlet (22) configured to provide a pathway for fluid from a first supply line to the valve chamber and a second valve inlet (24) configured to provide a pathway for fluid from a second supply line to the valve chamber. The universal rough-in valve includes a first valve outlet (29) configured to provide a pathway for fluid from the valve chamber to a first outlet line, and a valve manifold (72) coupled to the valve chamber.

20 Claims, 40 Drawing Sheets

UNIVERSAL ROUGH-IN VALVE MANIFOLD

BACKGROUND OF THE INVENTION

The present invention generally relates to a rough-in valve for a plumbing installation and, more particularly, to a universal rough in valve configured to receive either of a pressure balance valve or a thermostatic valve.

BRIEF SUMMARY OF THE INVENTION

A universal rough-in valve may include a valve chamber configured to receive a valve manifold, a first valve inlet configured to provide a pathway for fluid from a first supply line to the valve chamber. The universal rough-in valve may include a second valve inlet configured to provide a pathway for fluid from a second supply line to the valve chamber, a first valve outlet configured to provide a pathway for fluid from the valve chamber to a first outlet line, and a valve manifold coupled to the valve chamber. The fluid mixing valve may include a pressure balance valve or a thermostatic valve. The valve manifold may include a first manifold inlet, a second manifold inlet, and a first manifold outlet. The first manifold inlet may be co-axial with the first valve inlet. The second manifold inlet may be co-axial with the second valve inlet. The first manifold outlet may be co-axial with the first valve outlet.

The valve manifold may include a groove configured to receive a gasket and the gasket may be configured to form a seal with an internal wall of the valve chamber. The groove may extend around an exterior of the valve manifold. The gasket may include a plurality of rings connected by a strut. The plurality of rings may be configured to encircle the first manifold inlet, the second manifold inlet, and the first manifold outlet. The valve manifold may include a second manifold outlet. The first manifold outlet may be in fluid communication with the second manifold outlet. The valve manifold may include an outlet passageway including the first manifold outlet and the second manifold outlet, the outlet passageway may include a central portion having a smaller cross-sectional diameter than at least one of the first manifold outlet and the second manifold outlet.

The valve manifold is positioned at least partially between the fluid mixing valve and the valve chamber. The valve manifold may include a cavity configured to receive the fluid mixing valve, a first transition fluidly connecting the cavity and the first manifold inlet, and a second transition fluidly connecting the cavity and the second manifold inlet. The first transition may be transverse to the first manifold inlet. The second transition is transverse to the second manifold inlet. The valve manifold may include a first channel fluidly connecting the cavity and the first manifold outlet. The first transition may be positioned closer to a center of the valve manifold than the first channel. The fluid mixing valve may include a pressure balance valve.

The valve manifold may include a sidewall defining a cavity configured to receive the fluid mixing valve, a first transition fluidly connecting the cavity and the first manifold inlet, and a second transition fluidly connecting the cavity and the second manifold inlet. The first transition and the second transition may be at least partially formed within the sidewall. The first transition may be fluidly connected to the cavity at a first entry, the second transition may be fluidly connected to the cavity at a second entry, and the first entry may be positioned below the second entry. The first transition may extend through an exterior of the sidewall such that a portion of the first transition is defined by the sidewall and the valve chamber. The valve manifold may include a first channel fluidly connecting the cavity and the first manifold outlet. The first channel may be positioned closer to a center of the valve manifold than the first transition. The sidewall may include a plurality of depressions. The valve manifold may include a notch configured to receive a protrusion on the fluid mixing valve to couple the valve manifold to the fluid mixing valve. The valve manifold may be removably positioned in the valve chamber.

A universal rough-in valve may include a valve chamber defined by a chamber wall, a first valve inlet configured to provide a pathway for fluid from a first supply line to the valve chamber, and a second valve inlet configured to provide a pathway for fluid from a second supply line to the valve chamber. The universal rough-in valve may include a first valve outlet configured to provide a pathway for fluid from the valve chamber to a first outlet line and a valve manifold removably received within the valve chamber. The universal rough-in valve may include a pressure balance valve coupled to the valve manifold, the pressure balance fluidly connected to the first valve inlet, the second valve inlet, and the first valve outlet. Fluid may be configured to flow from the first valve inlet and the second valve inlet through the pressure balance valve and between the pressure balance valve and the chamber wall as the fluid flows to the first valve outlet.

A universal rough-in valve may include a valve chamber configured to receive either a pressure balance valve or a thermostatic valve, a first inlet configured to provide a pathway for fluid from a first supply line to the valve chamber, the first inlet extending along a first inlet axis, and a second inlet configured to provide a pathway for fluid from a second supply line to the valve chamber, the second inlet extending along a second inlet axis. The universal rough-in valve may include a first outlet extending along a first outlet axis, the first outlet configured to provide a pathway for fluid from the valve chamber to a first outlet line. The first inlet axis and the second inlet axis may be configured to provide a generally straight pathway for fluid between the first supply line and the second supply line.

In a further embodiment, the universal rough-in valve may include a second outlet configured to provide a pathway for fluid from the valve chamber to a second outlet line, the second outlet extending along a second outlet axis coplanar with the first inlet axis, the second inlet axis, and the first outlet axis.

In a further embodiment, the universal rough-in valve may include a first service stop moveable between a flow position wherein fluid can flow through the first inlet and a blocking position wherein the flow of fluid through the first inlet is prevented. The service stop may be configured to be rotated between the flow position and the blocking position. The first inlet may include a service stop opening configured to receive the first service stop. The first service stop may include a cap configured to threadingly engage the service stop opening to moveably secure the first service stop to the universal rough-in valve. The cap may include an aperture and the first service stop may include a stem configured to extend into the aperture. The stem and cap may each be rotatable relative to the universal rough-in valve. The stem and cap may be rotatable relative to the universal rough-in valve independently of one another. The cap may be configured to translate along a service stop axis as the cap is rotated.

The service stop may be axially fixed when the stem is rotated. The stem may include a rim configured to engage a lower portion of the cap. The service stop may include a boot configured to receive at least a portion of the stem, wherein the boot is configured to occlude the first inlet when the service stop is in the blocking position. An opening may extend through the boot and the stem such that fluid can flow through the boot and the stem when the service stop is in the flow position. The boot may include a plurality of gaskets configured to provide a fluid seal with a sidewall of the service stop opening. One of the plurality of gaskets may be adjacent the rim of the stem such that as the cap is rotated relative to the universal rough-in valve the rim moves the one of the plurality of gaskets into contact with another of the plurality of gaskets. The boot may include a flat bottom configured to abut a bottom surface of the first inlet. The cap may be configured to be rotated by a first tool and the stem may be configured to be rotated by a second tool, wherein the first tool is different from the second tool. The first inlet axis and the second inlet axis may be coaxial.

In a further embodiment, the universal rough-in valve may include a plug configured to be coupled to and prevent the flow of fluid through one of the first outlet and the second outlet. The first inlet axis, the second inlet axis, and the first outlet axis may be parallel. The first inlet axis and the second inlet axis may be co-axial. The first inlet axis, the second inlet axis, and the first outlet axis may be co-planar.

A universal rough-in valve may include a valve chamber configured to receive a fluid mixing valve, a first valve inlet configured to provide a pathway for fluid from a first supply line to the valve chamber, a second valve inlet configured to provide a pathway for fluid from a second supply line to the valve chamber, a first valve outlet configured to provide a pathway for fluid from the valve chamber to a first outlet line, and a guide configured to couple the universal rough-in valve to a surface of a wall for a plurality of distances between the universal rough-in valve and the surface of the wall.

The universal rough-in valve may include a receiver configured to engage the guide to couple the guide to the universal rough-in valve. The guide may include a face with a plurality of tabs extending from the face, the tabs configured to align the guide within a wall opening. The plurality of tabs may be arranged in a circular pattern. The guide may include a first opening configured to be selectively aligned with the receiver when the universal rough-in valve is to be positioned within a wall having a first thickness. The guide may include a second opening configured to be selectively aligned with the receiver when the universal rough-in valve is to be positioned within a wall having a second thickness. The first thickness may be less than the second thickness.

In a further embodiment, the guide may include a sleeve extending from a rear surface of the guide. The sleeve may be configured to engage the receiver, thereby aligning the guide with the universal rough-in valve. The sleeve may include an extension configured to engage an outer surface of the receiver. An end of the sleeve may engage a receiver face and the extension engages a receiver sidewall. The extension may include a semi-circular extension. The extension may include a prong having a shaft configured to be positioned adjacent the receiver sidewall and a shoulder configured to be positioned adjacent a receiver rear face when the guide is coupled to the universal rough-in valve. The prong may include a sloped surface configured to cause the prong to flex outwardly as the receiver contacts the sloped surface. The prong may include a frangible portion such that the guide may be detached from the universal rough-in valve by fracturing the prong. The frangible portion may be configured to be fractured by applying a force to the guide in a direction away from the universal rough-in valve.

The guide may include a projection configured to selectively engage the receiver. The projection may extend from the face of the guide further than the sleeve extends from the face of the guide. The guide may be detachably coupled to the universal rough-in valve. The guide may include a sidewall having a plurality of recesses, each of the plurality of recesses configured to receive one of the first valve inlet, the second valve inlet, and the first valve outlet. One of the plurality of recess may have a height that is different than another of the plurality of recesses.

In a further embodiment, the universal rough-in valve may include a fastener coupled to the guide, the fastener may be configured to engage a sidewall of a wall opening to secure the guide to the wall. The fastener may include a body and a head, at least one of the body and the head defining a tool engagement feature such that the fastener may be moved relative to the guide by a tool. The head may include a serrated edge. The head may be configured to engage the sidewall of the wall opening at an engagement point and the head may include a cam surface such that rotation of the fastener about a fastener axis changes the distance between the fastener axis and the engagement point.

BRIEF DESCRIPTION OF THE SEVERAL VIEWS OF THE DRAWINGS

The following detailed description of embodiments of the rough-in valve will be better understood when read in conjunction with the appended drawings of an exemplary embodiment. It should be understood, however, that the invention is not limited to the precise arrangements and instrumentalities shown.

In the drawings.

DETAILED DESCRIPTION OF THE INVENTION

Figure 29:
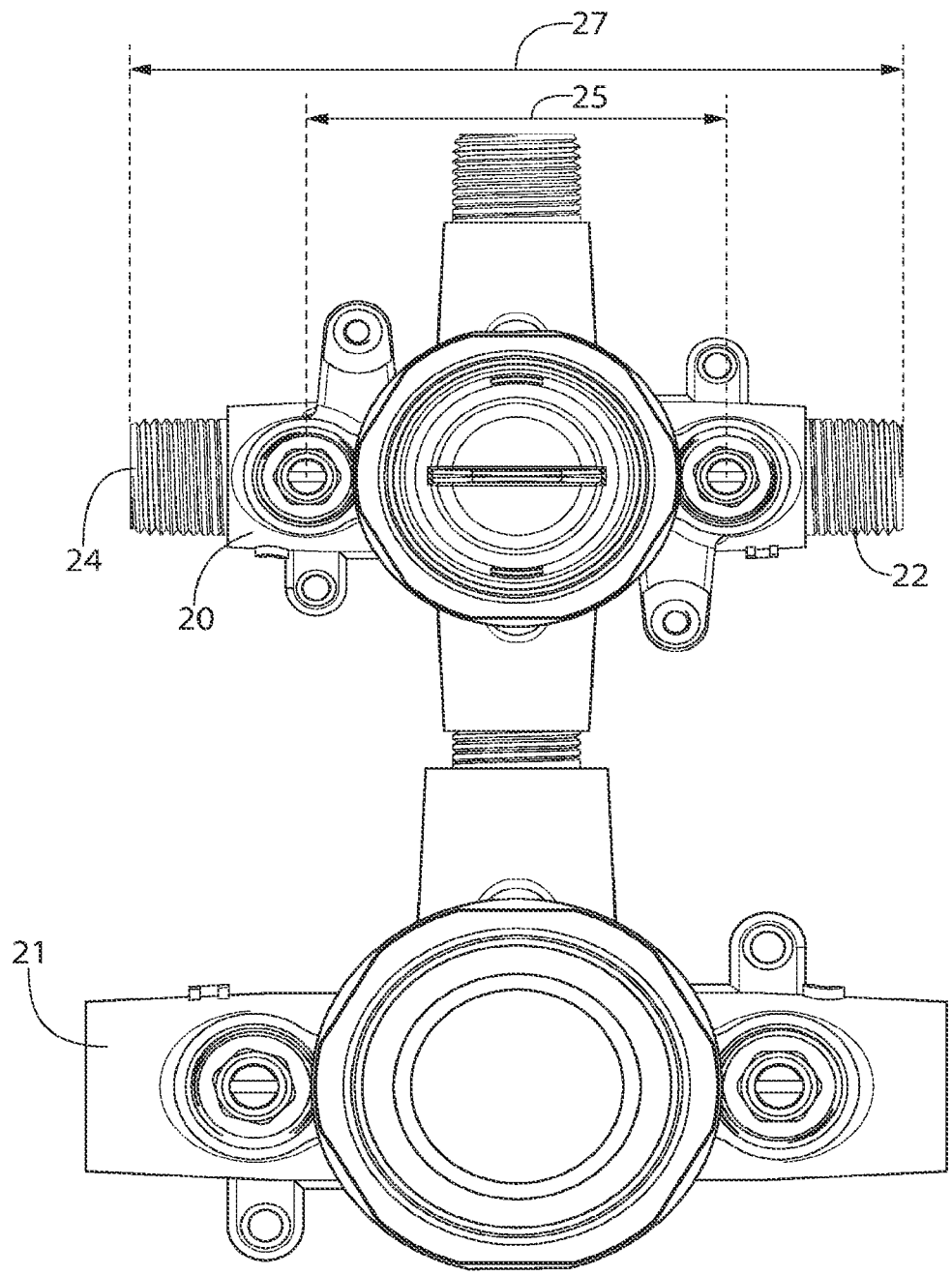
FIG. 29 is a front elevation view of the rough-in valve of FIG. 1 and an existing rough-in valve.

A rough-in valve is a valve used in plumbing systems to connect one or more fluid inlets to one or more fluid outlets. A rough-in valve may be adapted to selectively restrict or stop the flow of fluid from the one or more inlets. A hole in the wall may allow access to certain components of the rough-in valve during and following installation. A faceplate may be provided to cover the hole in the wall after installation. Due to space and/or aesthetic concerns, in certain installations, it may be desirable to have a universal rough-in valve which allows for a smaller size faceplate. As shown in FIG. 29, a rough-in valve 20 according to one or more embodiments of the present invention may have a smaller footprint than existing rough-in valves 21. It may also be desirable to provide a rough-in valve that is easier to manufacture and repair. It may also be desirable to provide a guide having a variable thickness to couple the rough-in valve to a surface of the wall. It may also be desirable to have a rough-in valve with at least one flat surface adapted to be positioned adjacent a support structure inside of a wall. The rough-in valve may be adapted to receive either of a pressure balance valve or a thermostatic valve. The rough-in valve may be configured to receive a fluid mixing valve (e.g., a pressure balance valve or a thermostatic valve) and a manifold coupled to the fluid mixing valve.

Referring to the drawings in detail, wherein like reference numerals indicate like elements throughout, there is shown in FIGS. 1-30 embodiments of a rough-in valve in accordance with exemplary embodiments of the present invention.

Figure 1:
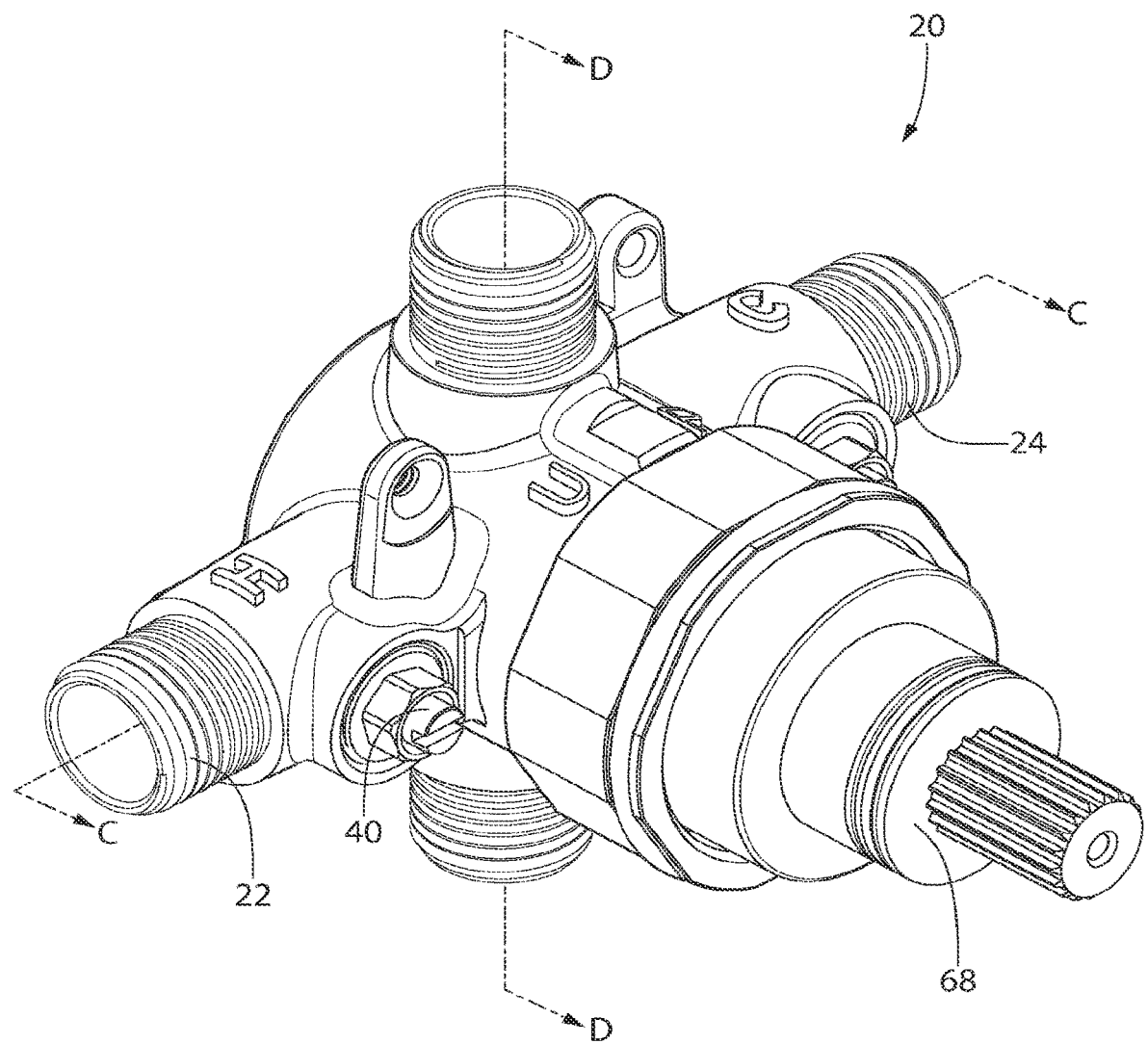
FIG. 1 is a top, front, right-side perspective view of a rough-in valve coupled to a pressure balance valve in accordance with an exemplary embodiment of the present invention.
Figure 30:
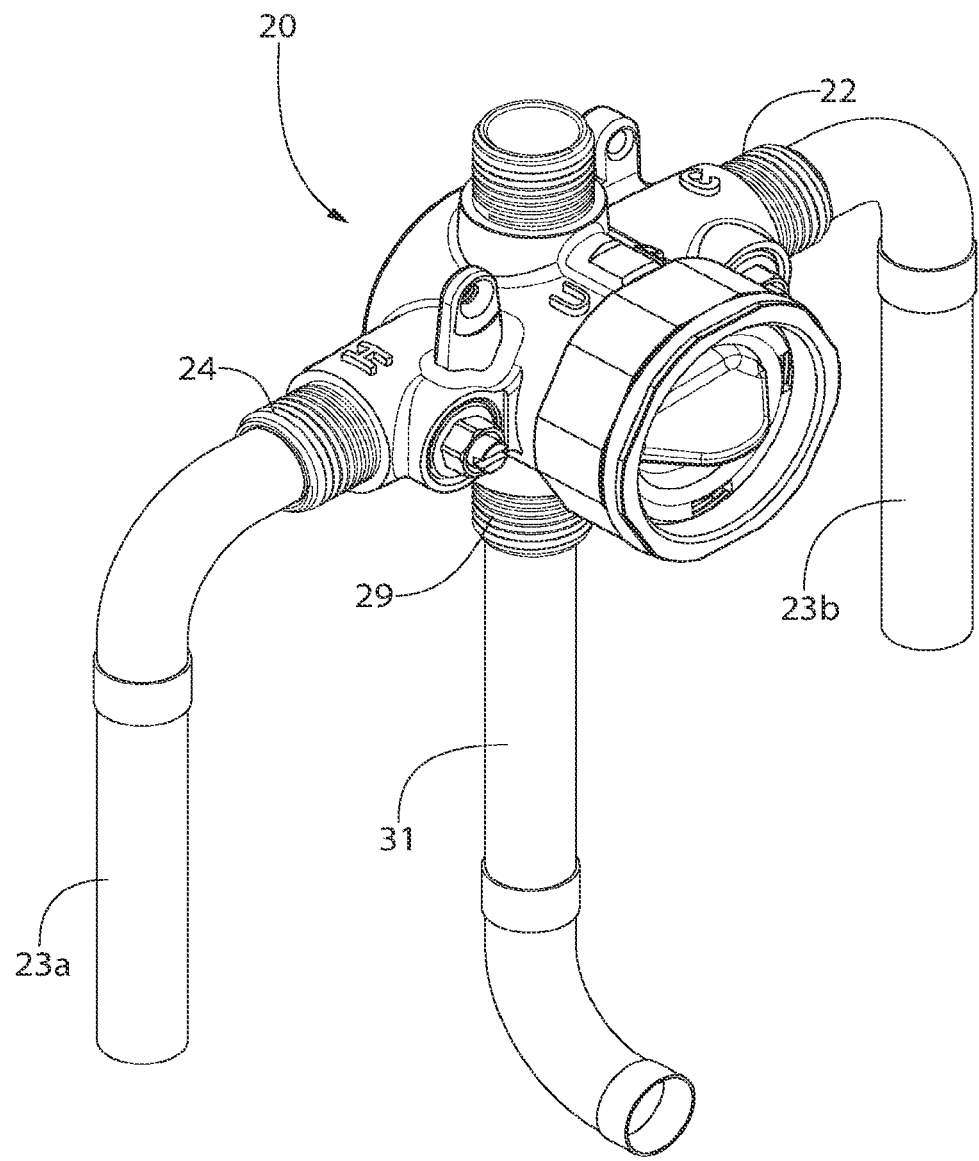
FIG. 30 is a perspective view of the rough-in valve of FIG. 1 coupled to water inlet lines.
Figure 31:
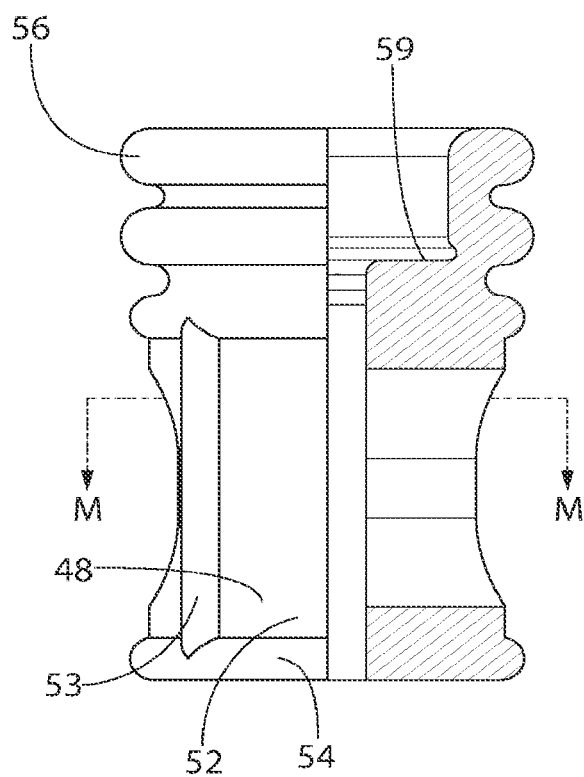
FIG. 31 is an isolated front elevation, partial sectional view of the boot of FIG. 4.

Referring to FIGS. 1 and 30, the rough-in valve 20 may be fluidly connected to one or more of a first water supply line (e.g., hot water), a second water supply line (e.g., cold water), a first water outlet (e.g., a shower head supply line), and a second water outlet (e.g, a tub faucet supply line). The rough-in valve 20 may include a first inlet 22 configured to be connected to the first water supply line 23b (FIG. 30). The valve may include a second inlet 24 configured to be connected to the second water supply line 23a (FIG. 30). The valve may include one or more outlets 29 fluidly connected to the first inlet 22 and the second inlet 24 such that fluid may flow through the first inlet 22 or second inlet 24 and out the outlet 29. The outlet 29 may be connected to an outlet pipe 31 (FIG. 30).

Figure 3:
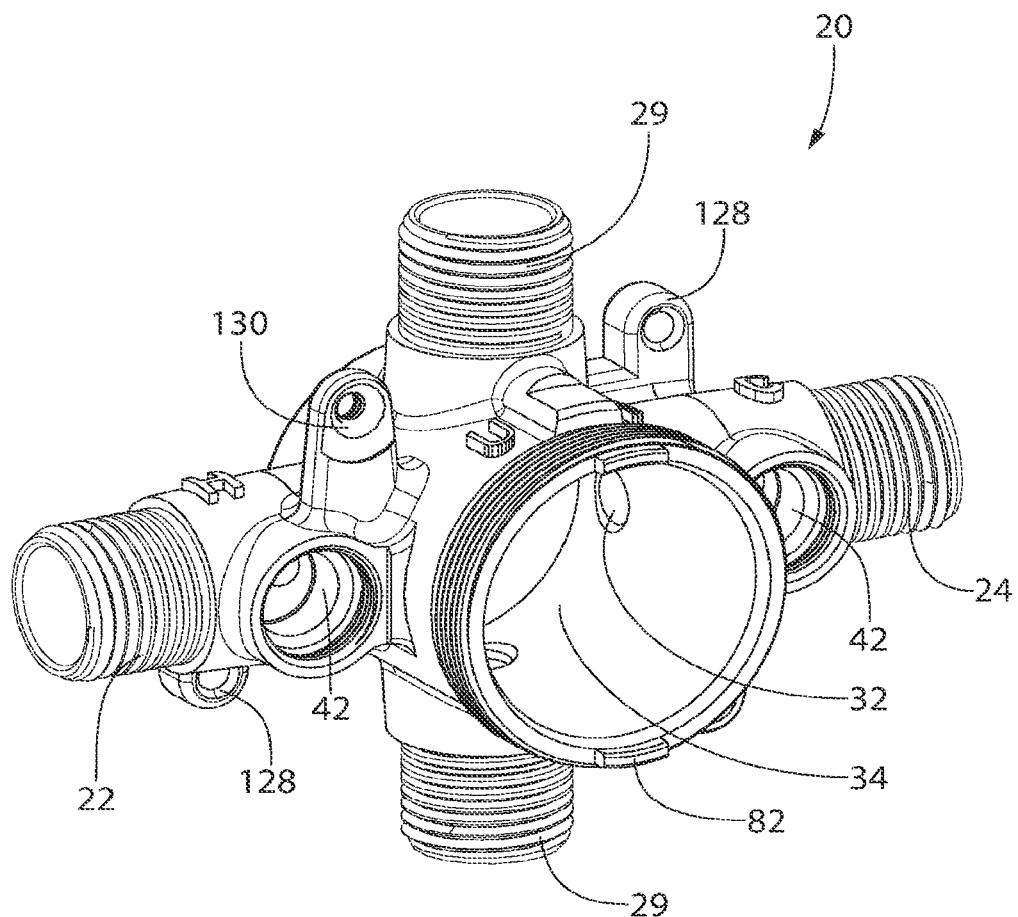
FIG. 3 is a front, right-side perspective view of the rough-in valve of FIG. 1.
Figure 5:
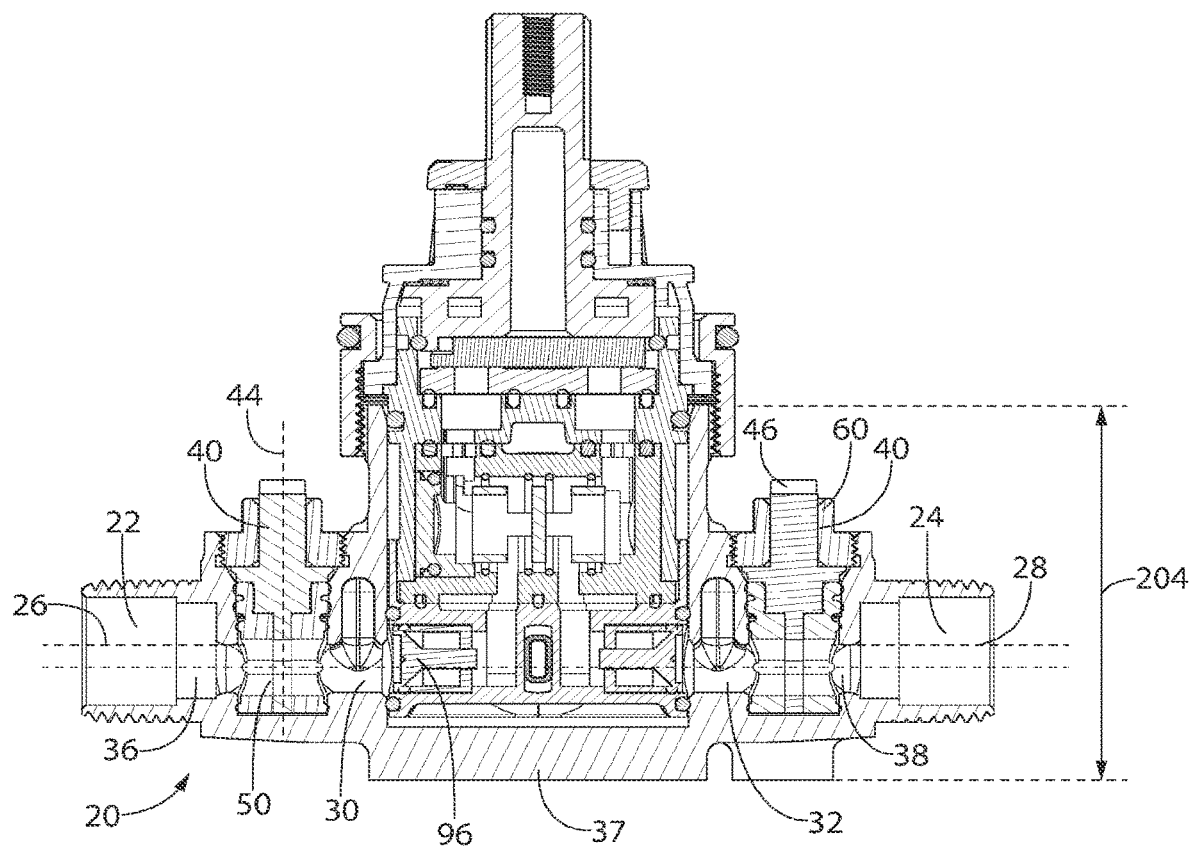
FIG. 5 is a bottom, sectional view along a plane define by line C-C of the rough-in valve of FIG. 1.

Referring to FIG. 5, the first inlet 22 may include a first inlet axis 26. The first inlet axis 26 may be an axis of symmetry for at least a portion of the first inlet 22. The second inlet 24 may include a second inlet axis 28. The first inlet axis 26 may be parallel to the second inlet axis 28. In one embodiment, the first inlet axis 26 is co-axial with the second inlet axis 28. The first inlet 22 may be fluidly connected to a first passageway 30 such that fluid can flow through the first inlet 22 and into the first passageway 30. The first passageway 30 and second passageway 32 may each be fluidly connected to a valve chamber 34 such that fluid can flow through each of the first passageway 30 and the second passageway 32 and into the valve chamber 34 (FIG. 3). The first passageway 30 may include a cross-sectional area which is smaller than a cross-sectional area of the first inlet 22. The second passageway 32 may include a cross-sectional area which is smaller than a cross-sectional area of the second inlet 24. The cross-sectional areas of the first passageway 30 and the second passageway 32 may be substantially the same. The first inlet 22 and the second inlet 24 may provide a generally straight pathway for fluid between the first supply line and the second supply line. A generally straight pathway may provide a rough-in valve that costs less to manufacture than a rough-in valve with a non-straight pathway. A generally straight pathway may allow the rough-in valve to be machined rather than cast during manufacture. A generally straight pathway may also result in a rough-in valve having a smaller foot print than a rough-in valve with a non-straight pathway.

Still referring to FIG. 5, the first passageway 30 may include a first passageway axis 36. The second passageway 32 may include a second passageway axis 38. The first passageway axis 36 may be co-axial with the second passageway axis 38. In some embodiments, the first passageway axis 36 is parallel to, but offset from, the second passageway axis 38. In one embodiment, the first passageway axis 36 is parallel to, but offset from, the first inlet axis 26. In another embodiment, the first passageway axis 36 is co-axial with the first inlet axis 26. In one embodiment, the first inlet 22, the first passageway 30, the valve chamber 34, the second inlet 24, and the second passageway 32 are aligned to define a continuous fluid flow path through the rough-in valve 20. In one embodiment, the continuous flow path extends along a single axis.

Referring to FIGS. 4-6 and 29, the first inlet 22 and the second inlet 24 may each include an opening 42 configured to receive a service stop 40. In one embodiment, the distance 25 between the service stops is about 60 mm to about 90 mm. In one embodiment, the distance 27 between the ends of the first inlet 22 and the second inlet 24 is about 120 mm to about 160 mm. The service stop 40 may be moveable relative to the rough-in valve 20 from a first position wherein fluid can flow through the first passageway 30 or second passageway 32 past the service stop 40, to a second position wherein the service stop 40 prevents fluid flow through the first passageway 30 or the second passageway 32, as explained in greater detail below. The opening 42 may include an opening axis 44. The opening axis 44 may be transverse to at least one of the first passageway axis 36 and the second passageway axis 38. In one embodiment, the opening axis 44 is perpendicular to at least one of the first passageway axis 36 and the second passageway axis 38. The openings 42 may be aligned with the first passageway 30 and the second passageway 32 such that the service stops 40 may extend through the openings 42 and into the first passageway 30 and the second passageway 32. In one embodiment, each opening 42 defines a passageway for receiving the service stop 40 which intersects one of the first passageway 30 and the second passageway 32. In one embodiment, a height 204 of the rough-in valve 20 is about 90 mm to about 110 mm (FIG. 5). In one embodiment, the height 204 of the rough-in valve 20 is about 105 mm. In one embodiment, the height 204 of the rough-in valve 20 is about 1 inch shorter than existing rough-in valves. In one embodiment, the rough-in valve 20 weighs about 15% to about 25% less than existing rough-in valves. In one embodiment, the rough-in valve 20 weighs about 17% less than existing rough-in valves. In one embodiment, the rough-in valve 20 weighs about 21% less than existing rough-in valves.

Figure 4:
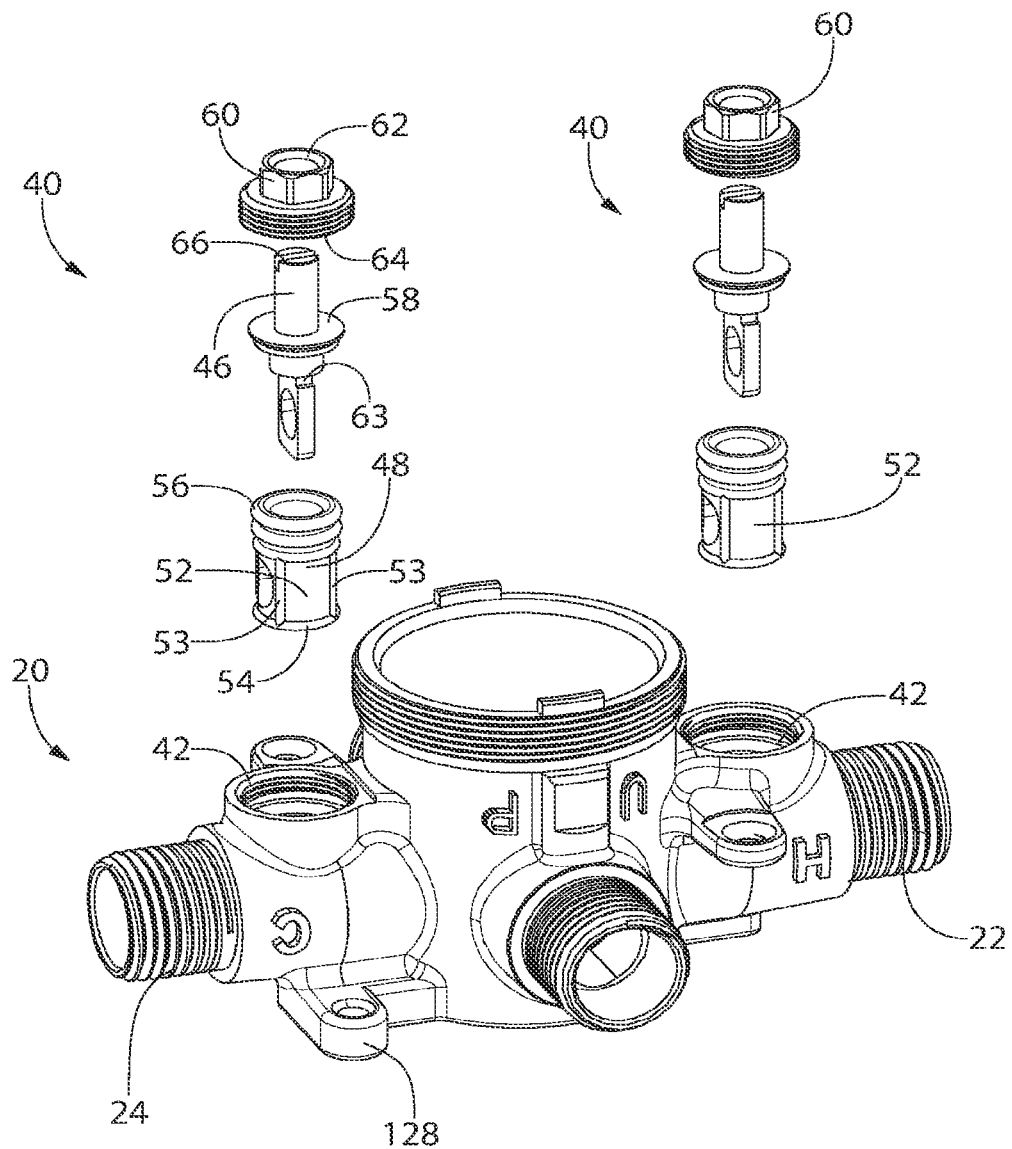
FIG. 4 is a top, left-side exploded perspective view of the rough-in valve and valve stoppers of FIG. 1.

Referring to FIGS. 4-5, in one embodiment, the service stop 40 is a service stop assembly comprising a stem 46 and a boot 48. The boot 48 may be adapted to receive at least a portion of the stem 46. The stem 46 and the boot 48 may each include an opening which defines a service stop passageway 50 when the stem 46 is at least partially within the boot 48. The service stop passageway 50 may be aligned with the first passageway 30 or the second passageway 32 when the service stop 40 is within the opening 42 in the first inlet 22 or the second inlet 24. Fluid may flow through the first passageway 30 and the service stop passageway 50 when the service stop 40 is in the first position (e.g., when the service stop passageway 50 is aligned with the first passageway 30). In one embodiment, the opening of the stem 46, the boot 48, and the first passageway 30 have the same cross-sectional shape. The service stop passageway 50 may be defined by passageway sidewalls. The boot 48 may include sidewalls 52 such that when the service stop 40 and the boot 48 is rotated relative to the rough-in valve 20 from the first position to the second position, the sidewalls 52 obscure the first passageway 30 or second passageway 32 such that the flow of fluid through the first passageway 30 or the second passageway 32 is prevented. The stem 46 and boot 48 may be rotatably fixed to each other such that the boot 48 rotates when the stem 46 is rotated. The boot 48 may be detachably coupled to the stem 46 such that the boot 48 may be replaced, if desired.

Referring to FIGS. 5 and 31-33, the boot 48 may include a bottom 54 which engages a bottom of the first passageway 30 or the second passageway 32. In one embodiment, the boot 48 has a cylindrical shape with a flat bottom 54. The bottom of the first passageway 30 or second passageway 32 may be flat to enhance the seal between the flat bottom 54 of the boot 48 and the passageway compared to a boot with a non-flat bottom. In one embodiment, the bottom 54 comprises a flexible material such that the bottom flexes to form a seal with the bottom of the passageway to prevent the flow of fluid between the bottom 54 and the bottom of the passageway. In one embodiment, the boot 48 includes a gasket 56 that abuts against a rim 58 of the stem 46. In another embodiment, the boot 48 includes a plurality of gaskets 56 to prevent the flow of fluid through the opening 42 when the service stop 40 is within the opening 42. The plurality of gaskets 56 may be axially spaced from each other. The plurality of gaskets 56 may be separated by grooves (e.g., circumferential grooves).

Figure 32:
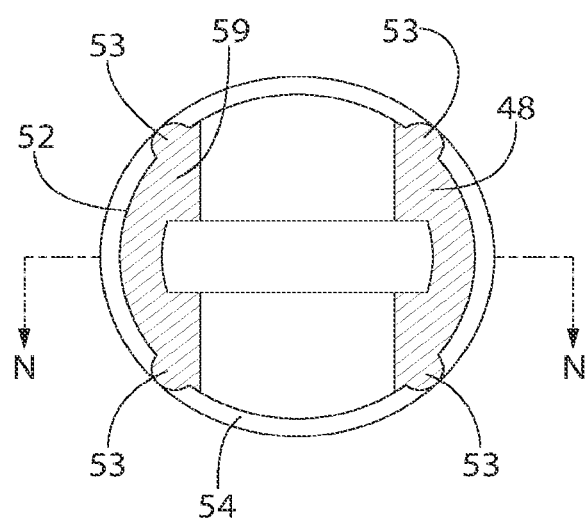
FIG. 32 is a top sectional view of the boot of FIG. 31 along a plane defined by line M-M.
Figure 33:
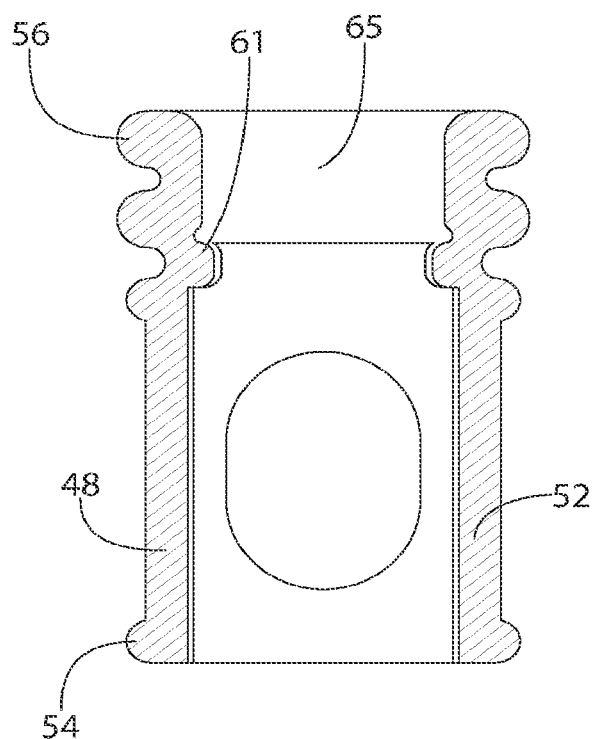
FIG. 33 is a sectional view of the boot of FIG. 32 along a plane defined by line N-N.

In one embodiment, the boot 48 includes one or more ribs 53 extending along at least a portion of the length of the boot 48. The rib 53 may form a seal against a sidewall of the first passageway 30 or second passageway 32. The ribs 53 may be positioned about the perimeter of the boot 48 such that a seal with the passageway is formed when the service stop 40 is in each of the first position (FIG. 5) and the second position. In one embodiment, the boot 48 includes a plurality of ribs 53 that engage the sidewall of the first passageway 30 and form a chamber in the space between adjacent ribs 53 on the boot 48 and the sidewall. The ribs 53 may be positioned about the boot 48 such that at least two ribs 53 are in contact with the sidewall regardless of the position on the boot 48. The ribs 53 may protrude from the sidewall 52 by about 1 mm to about 10 mm. In one embodiment, the ribs 53 and the bottom 54 of the boot each extend from the sidewall 52 by an equal amount (FIG. 32). The boot 48 may include a shoulder 59 (FIG. 31) adapted to engage a bottom of the rim 58 of the stem 46 (FIG. 5). The boot 48 may include an internal gasket 61 (FIG. 33) adapted to engage a recess 63 on the stem 46 (FIG. 5). The internal gasket 61 may extend inwardly from the sidewall 52 into a stem receiving opening 65 (FIG. 33).

Figure 6:
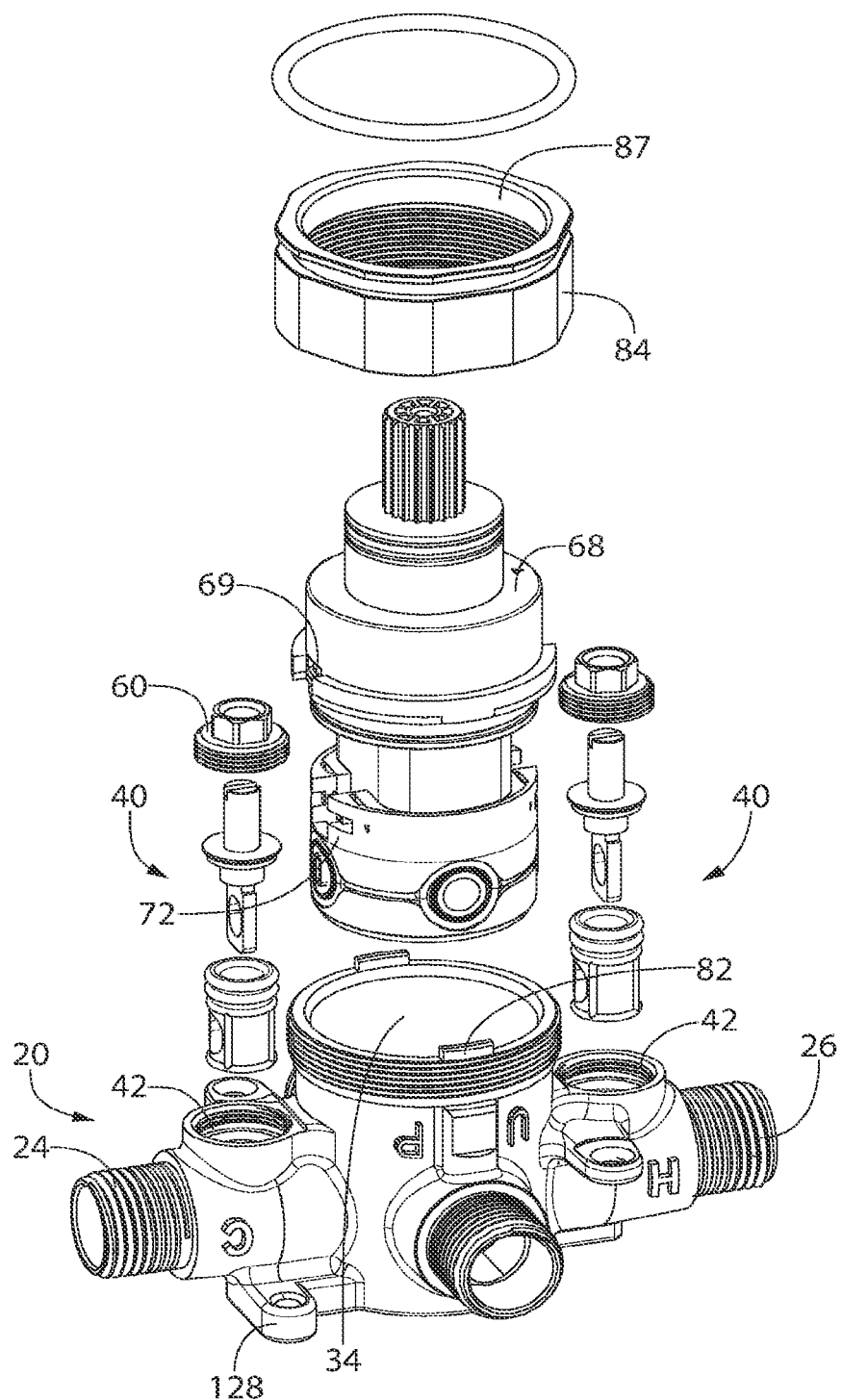
FIG. 6 is an exploded front, top perspective view of the rough-in valve of FIG. 1.

Referring to FIGS. 4-6, the service stop 40 may include a cap 60 adapted to at least partially secure the service stop 40 to the rough-in valve 20. The cap 60 may include an aperture 62 configured to receive the stem 46 such that a lower portion 64 of the cap 60 abuts the rim 58. A top 66 of the stem 46 may be accessible through the aperture 62 when the cap 60 abuts the rim 58. An outer portion of the cap 60 may be threaded such that the cap is threadingly engaged with the opening 42. The cap 60 and the stem 46 may each be rotatable relative to the rough-in valve 20. In one embodiment, the cap 60 is rotatable relative to the rough-in valve 20 independently of the stem 46 such that the stem 46 can be rotated to move the service stop 40 between the first position and the second position without disturbing the threaded engagement between the cap 60 and the rough-in valve 20.

In one embodiment, the top 66 of the stem 46 includes an engagement feature such that the stem 46 can be engaged by a tool (e.g., screwdriver or wrench) to move the service stop 40 between the first position and the second position. The top 66 of the stem 46 may extend above a top of the cap 60. The stem 46 may include more than one engagement feature (e.g., slot for a screwdriver and a hexagonal shape engageable with a wrench).

Figure 14:
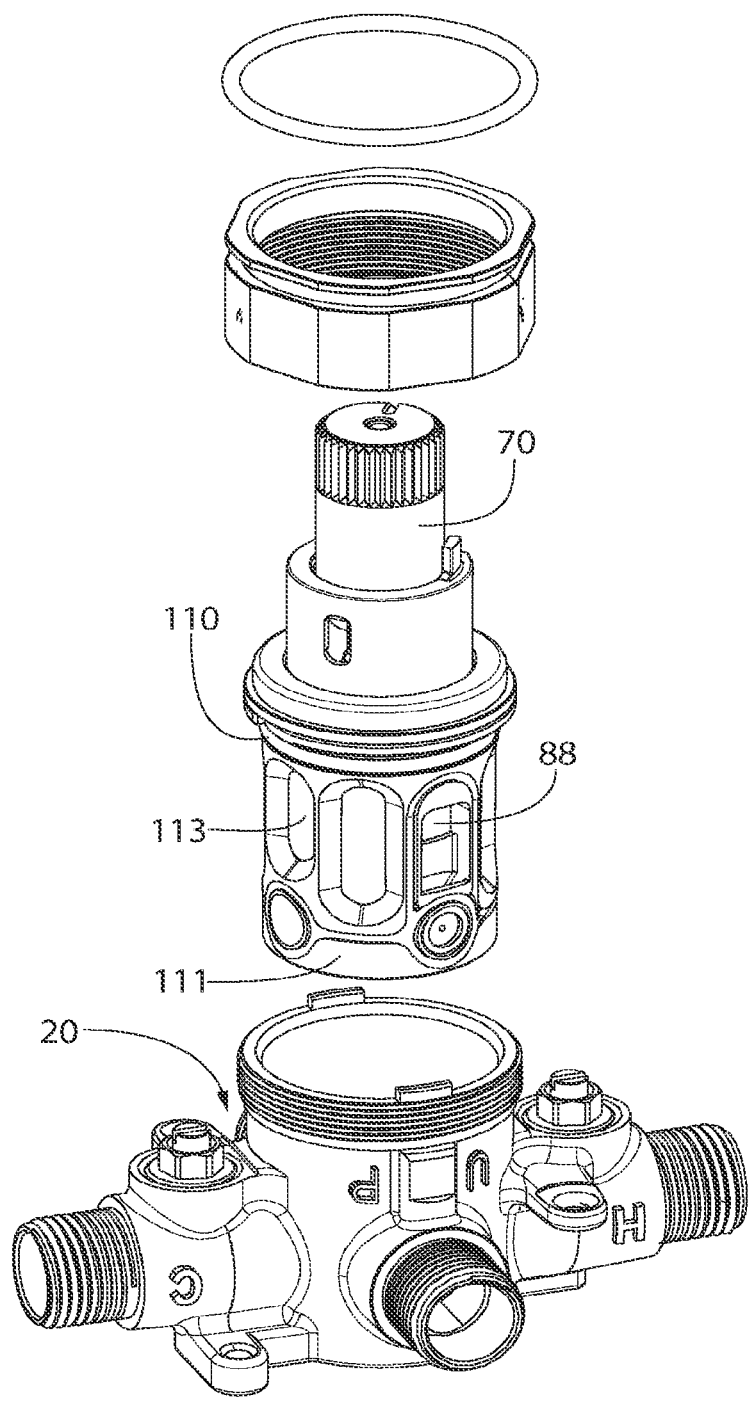
FIG. 14 is a front perspective view of a thermostatic valve manifold in accordance with one embodiment of the present invention and the rough-in valve shown in FIG. 1.
Figure 15:
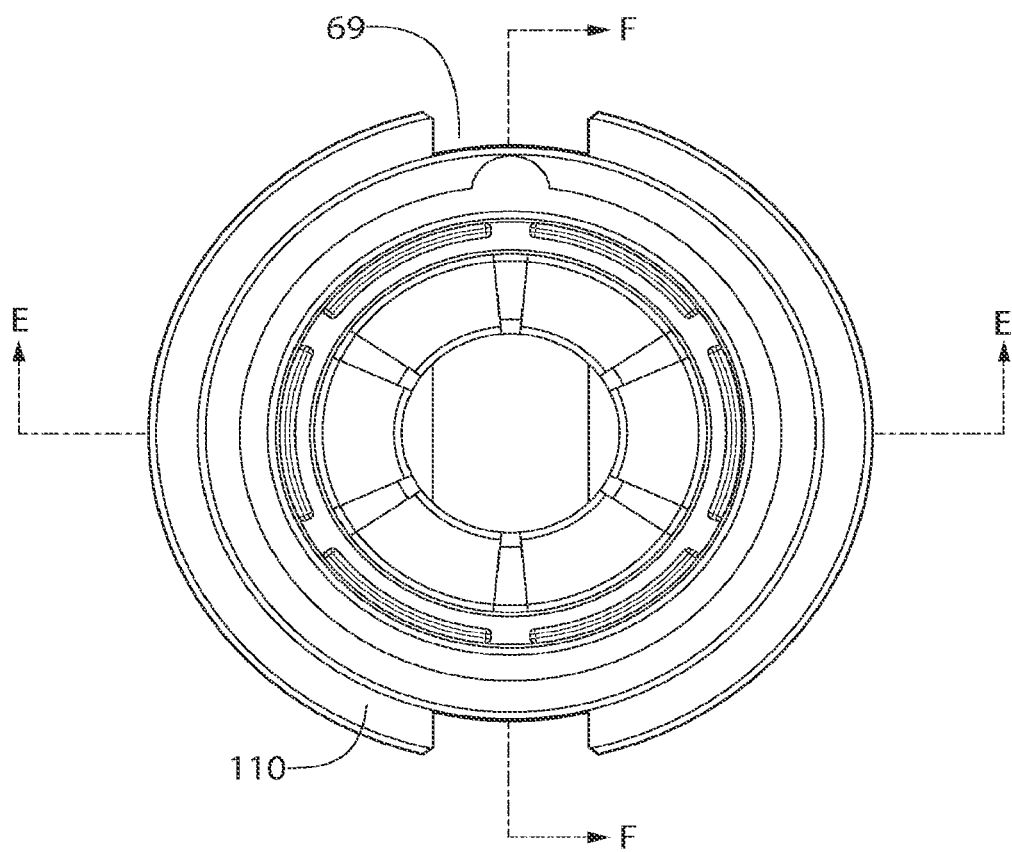
FIG. 15 is a front elevation view of the thermostatic valve manifold of FIG. 14.

Referring to FIGS. 6 and 14, the valve chamber 34 may be configured to receive a pressure balance valve 68 (FIG. 6) or a thermostatic valve 70 (FIG. 14). One pressure balance valve contemplated for use with the system described herein is P/N: GM40HLC-A manufactured by Kaiping Yizhan Valve Corp. Co. One thermostatic cartridge contemplated for use with the system described herein is P/N: 14010240U_Element_TH_01162742 manufactured by Grohe. In one embodiment, the valve chamber 34 is adapted to selectively receive either of a pressure balance valve or a thermostatic valve. In one embodiment, the valve chamber 34 is configured to receive a manifold coupled to either the pressure balance valve 68 or thermostatic valve 70 such that a single rough-in valve 20 can receive the pressure balance valve or the thermostatic valve.

Referring to FIGS. 6-12, the pressure balance valve 68 may be adapted to receive two separate fluid flows and alter the flow of one fluid based on a change in flow pressure of the other fluid. The rough-in valve 20 may include a valve cap 84 which may be detachably coupled to the rough-in valve 20 (e.g., by threaded engagement). The valve cap 84 may at least partially retain the pressure balance valve 68 or thermostatic valve 70 within the valve chamber 34. In one embodiment, the valve cap 84 is threadingly coupled to the rough-in valve 20. The valve cap 84 may include a sidewall 87 defining a central opening such that the pressure balance valve 68 or thermostatic valve 70 is accessible through the valve cap 84 when the valve cap is coupled to the rough-in valve 20. The rough-in valve 20 may include one or more tabs 82 (FIG. 6) to rotationally fix the pressure balance valve 68, the thermostatic valve 70, or a thermostatic valve manifold 110 relative to the rough-in valve 20. The pressure balance valve 68, thermostatic valve 70, or thermostatic valve manifold 110 (FIG. 14) may include one or more recesses 69 adapted to receive the tab 82.

Figure 34:
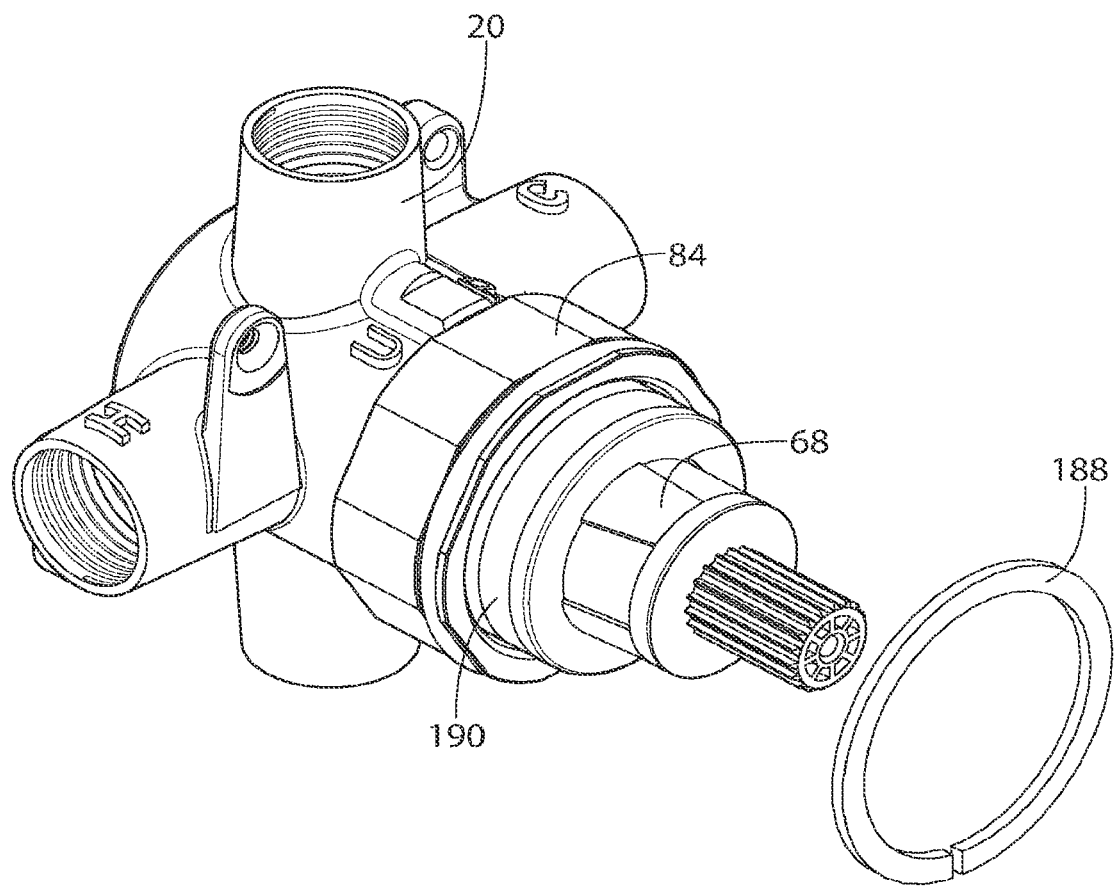
FIG. 34 is a perspective view of a pressure balance valve coupled to a rough-in valve with a ring separated from the pressure balance valve.
Figure 35:
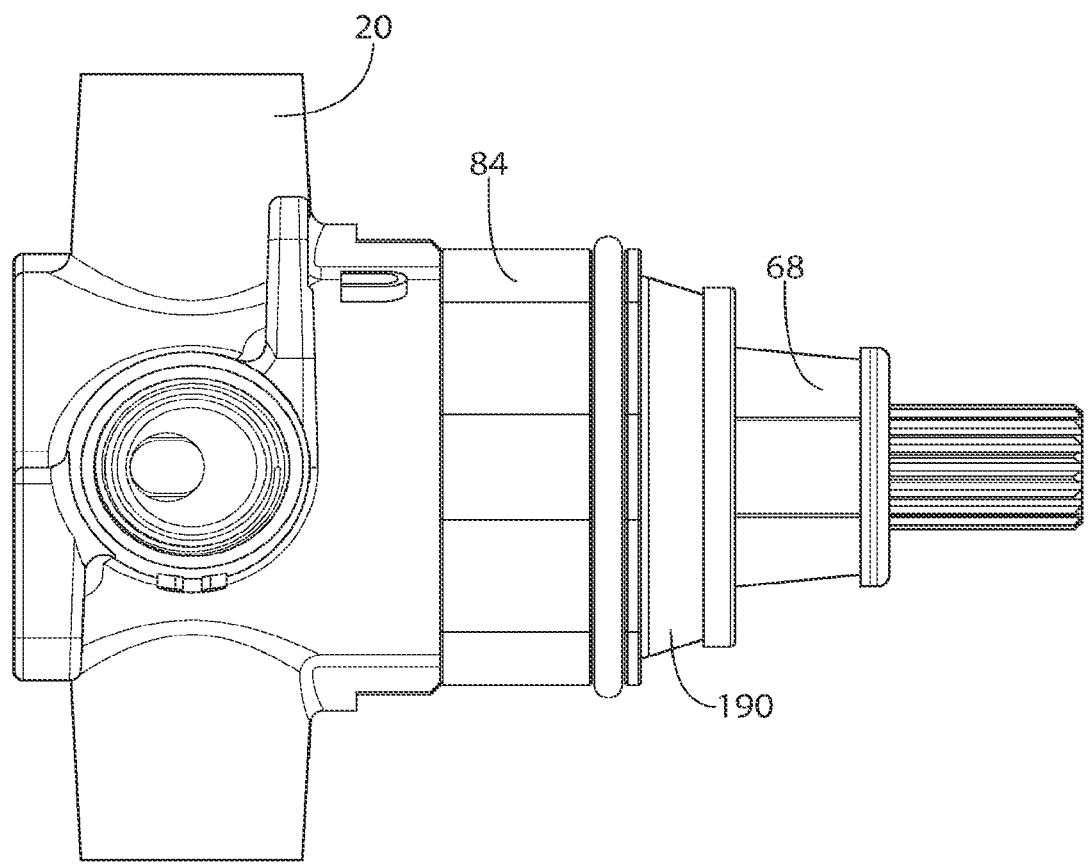
FIG. 35 is a right side elevation view of the pressure balance valve and rough-in valve of FIG. 34.
Figure 36:
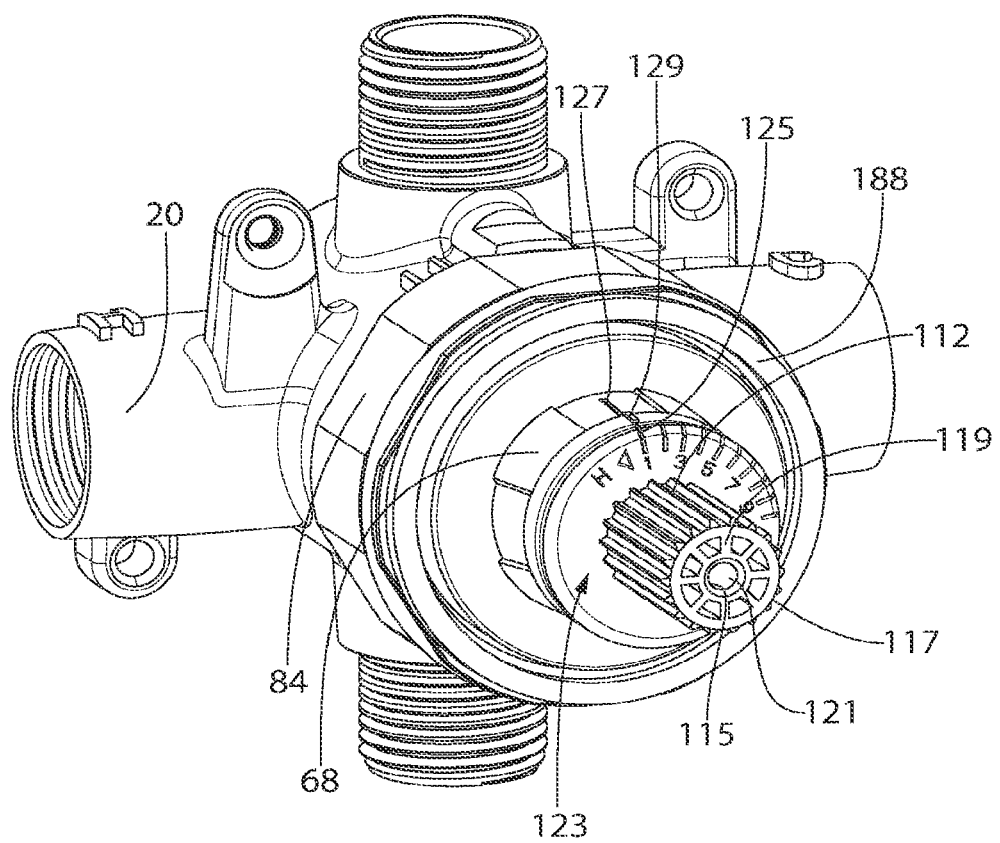
FIG. 36 is a perspective view of the pressure balance valve and rough-in valve of FIG. 34 with the ring coupled to the pressure balance valve.

Referring to FIGS. 34-36, in one embodiment, the pressure balance valve 68 is configured to receive a ring 188. The ring 188 may be adapted to be removably coupled to the pressure balance valve 68. The pressure balance valve 68 may include a trough 190 adapted to receive the ring 188. The trough 190 may be a recess in an outer wall of the pressure balance valve 68. The ring 188 may be a split ring configured to expand when an external force is applied to the ring 188. The ring 188 may be configured to return toward its original shape when the external force is no longer applied to the ring 188. The ring 188 may be coupled to the pressure balance valve 68 to assist in removing the pressure balance valve 68 from the rough-in valve 20. The ring 188 may be placed in the trough 190 when the valve cap 84 is coupled to the rough-in valve 20. The ring 188 may overlap the valve cap 84 when the ring 188 is coupled to the pressure balance valve 68 such that as the valve cap 84 is de-coupled from the rough-in valve (e.g., by rotating to disengage a threaded connection), the valve cap 84 pushes against the ring 188 which pushes against a sidewall of the trough 190, thereby de-coupling the pressure balance valve 68 from the rough-in valve 20 (FIG. 36). In one embodiment, the ring 188 is re-usable with other rough-in valves or pressure balance valves. In some embodiments, a user can manually grasp the ring 188 to remove the pressure balance valve 68 from the rough-in valve 20. In other embodiments, a user can position a tool (not shown but could, for example, a screwdriver or pliers) between the ring 188 and the cap 84 to remove the pressure balance valve 68 from the rough-in valve 20.

Figure 7:
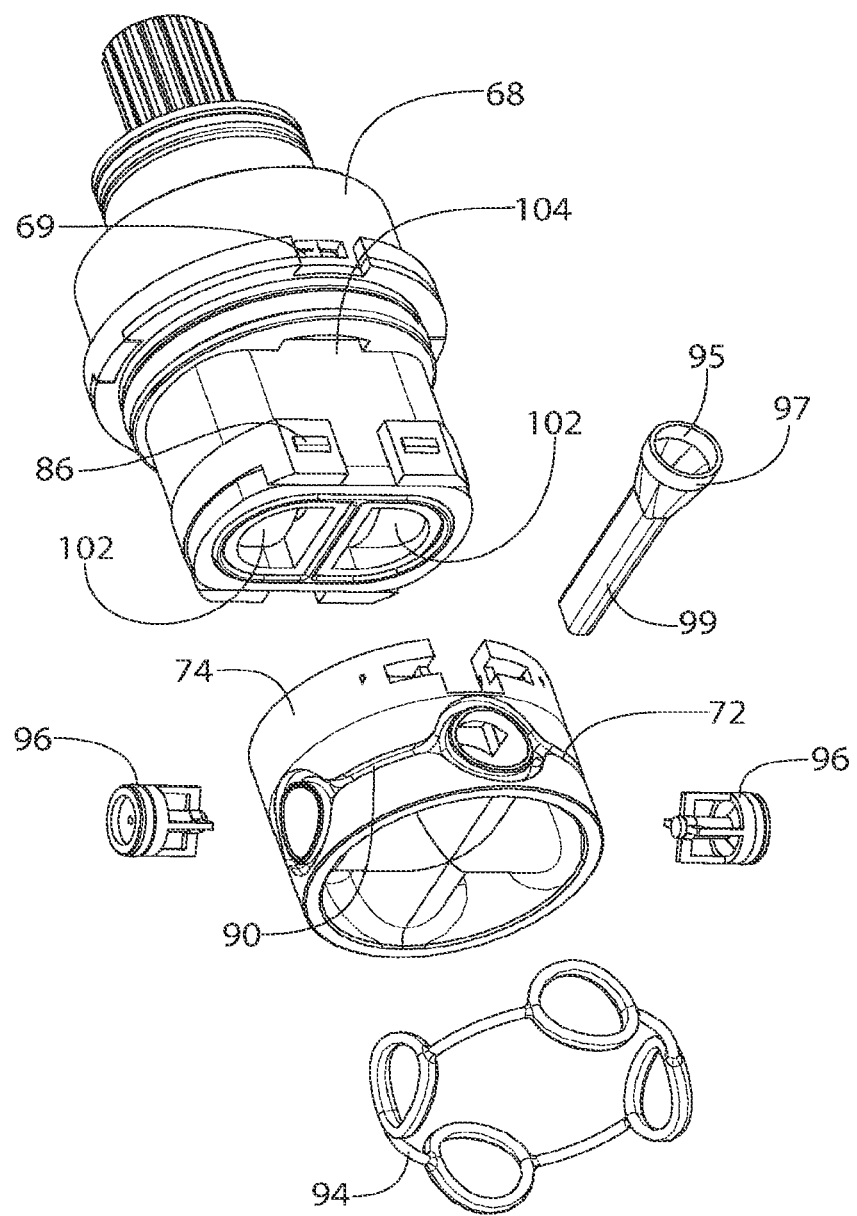
FIG. 7 is an exploded perspective view of the pressure balance valve of the rough-in valve shown in FIG. 1.
Figure 8:
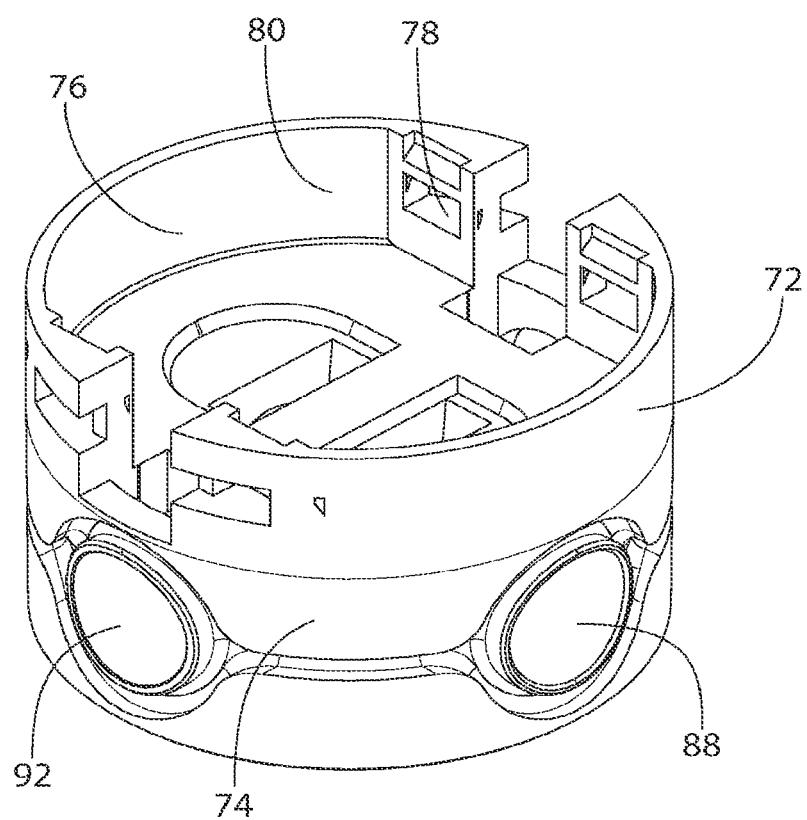
FIG. 8 is a front perspective view of the pressure balance valve manifold of the rough-in valve shown in FIG. 7.
Figure 9:
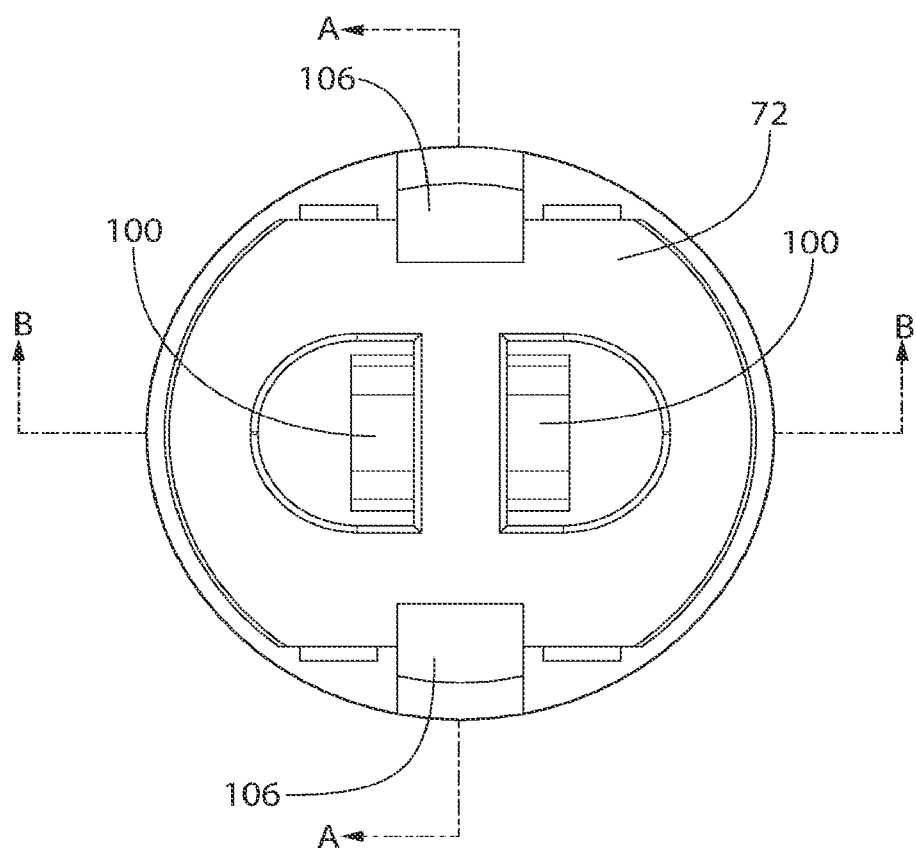
FIG. 9 is a front elevation view of the pressure balance valve manifold of FIG. 7.
Figure 10:
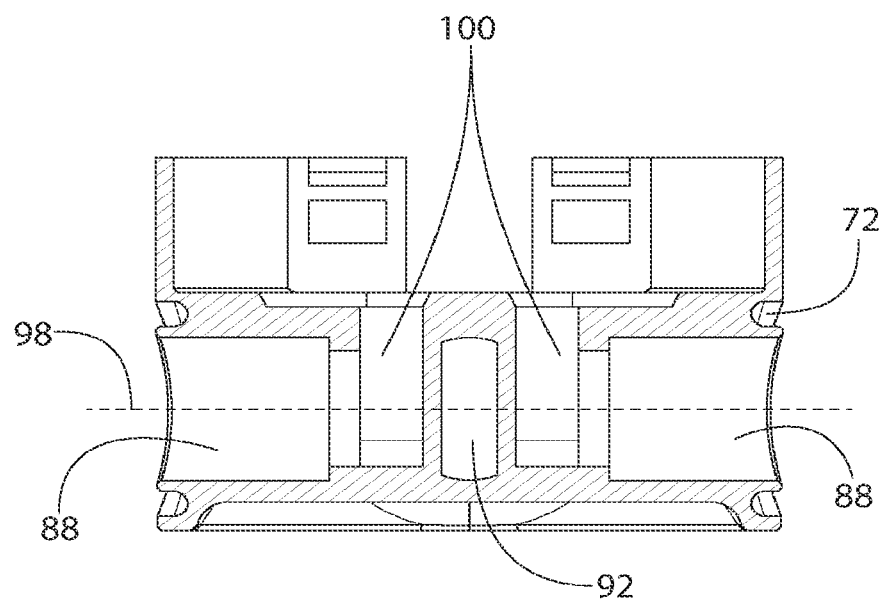
FIG. 10 is a sectional view along a plane defined by line B-B of the pressure balance valve manifold of FIG. 9.
Figure 11:
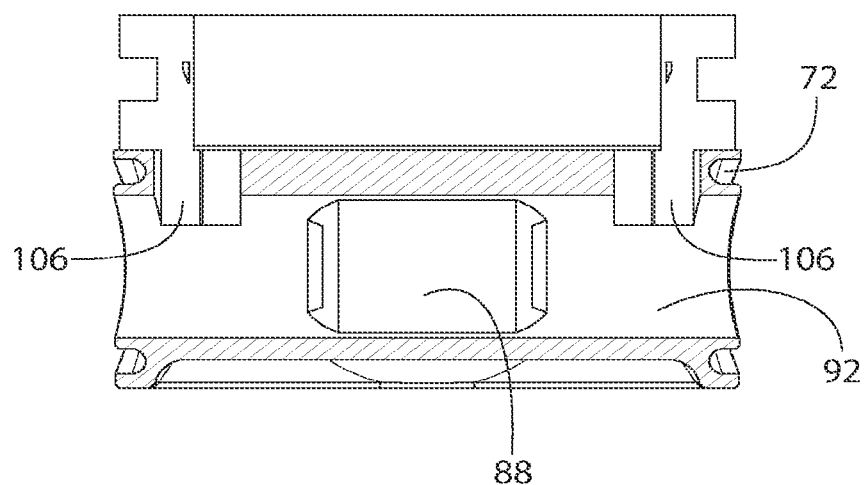
FIG. 11 is a sectional view along a plane defined by line A-A of the pressure balance valve manifold of FIG. 9.

Referring to FIGS. 7-8, in one embodiment, the pressure balance valve 68 is coupled to a pressure balance valve manifold 72. In one embodiment, the pressure balance valve manifold 72 has a height of about 20 mm to about 30 mm. In one embodiment, the pressure balance valve manifold 72 has a diameter of about 35 mm to about 50 mm. The pressure balance valve manifold 72 may include a body 74 with an upper portion 76 adapted to receive at least a portion of the pressure balance valve. The upper portion 76 may include an outer wall 80 defining a receiving area for the pressure balance valve 68. The outer wall 80 may include notches 78 adapted to receive protrusions 86 (FIG. 7) on the pressure balance valve 68. The notches 78 and protrusions 86 may allow detachable coupling such that either of the pressure balance valve 68 and the pressure balance valve manifold 72 may be replaced, if desired. The pressure balance valve manifold 72 may comprise a different material than the rough-in valve 20. In one embodiment, the pressure balance valve manifold 72 is manufactured from plastic (e.g., polyamide 1010) and the rough-in valve 20 is manufactured from brass, copper, or bronze.

Still referring to FIGS. 7-8, the pressure balance valve manifold body 74 may include one or more inlets 88. An inlet 88 may be aligned with the first inlet 22 of the rough-in valve 20 such that fluid can flow through the first inlet 22 and into the pressure balance valve manifold 72. A check valve 96 may be positioned within the inlets 88. The pressure balance valve manifold 72 may include a groove 90 adjacent one or more of the inlets 88 and outlets 92. A gasket 94 may be positioned within the groove 90. The gasket 94 may include a plurality of rings connected by struts and each of the rings may surround an inlet 88 or outlet 92. The gasket 94 may help keep the inlet fluid separate from the outlet fluid when the pressure balance valve manifold 72 is within the rough-in valve 20. The rings may form a seal with a sidewall of the rough-in valve 20 to ensure that fluid flowing through the first inlet 22 and second inlet 24 enters the inlet 88.

Referring to FIGS. 5, 7, and 9-12, the inlets 88 may extend along an axis 98 generally parallel to the first inlet axis 26 and the second inlet axis 28. In one embodiment, the inlets 88 may be co-axial to the first inlet axis 26 and the second inlet axis 28. The inlets 88 may include a transition 100 which provide a pathway for fluid between the inlets 88 and the pressure balance valve entries 102. The pressure balance valve may include an outlet 104 such that the first fluid and second fluid flow through the inlets 88, into the pressure balance valve 68, and out the outlet 104 along an outer portion of the pressure balance valve 68. The pressure balance valve manifold 72 may include one or more channels 106 which fluidly connect the pressure balance valve outlet 104 to the outlets 92. The outlet 92 may be connected to a pipe or hose connected to a plumbing fixture (e.g., shower head, tub outlet). One end of the outlet 92 may be coupled to a plug (not shown) such that the fluid only flows from the other end of the outlet 92. In one embodiment, the outlet 92 extends through (e.g., completely through or through a substantial portion of) the pressure balance valve manifold 72. In one embodiment, the pressure balance valve manifold 72 is symmetrical about one of planes A-A and B-B. In one embodiment, one end of the outlet 92 includes a circular cross-section and the other end of the outlet 92 includes a rectangular cross-section. In one embodiment, the outlet 92 transitions from a first portion having circular cross-section to a second portion having rectangular cross-section having a smaller cross-sectional area than the first portion. The second portion having a smaller cross-sectional area may provide a venturi effect.

The pressure balance valve manifold 72 may include a venturi 95 adapted to be positioned within the outlet 92. The venturi 95 may be removably coupled to the pressure balance valve manifold 72. The venturi 95 may include a first portion 97 and a second portion 99. The first portion 97 may have a frustoconical shape. The first portion 97 may transition from a first cross-sectional area to a second cross-sectional area. The first cross-sectional area may be larger than the second cross-sectional area. The second portion 99 may have a rectangular cross section. The second portion 99 may have a smaller cross-sectional area than the outlet 92. An outer surface of the first portion 97 may be substantially the same size as the outlet 92 such that a fluid seal is formed between the first portion 97 and the wall of the outlet 92. The venturi 95 may extend from a first side of the outlet 92 to a second side of the outlet 92. The venturi 95 may extend from the first side of the outlet 92 toward, but not extend to, the second side of the outlet. The venturi 95 may be oriented such that the second portion 99 is closer to a tub supply line than the first portion 97 (e.g. the first portion 97 may be above the second portion 99) to ensure that fluid flowing through the rough-in valve 20 flows into the tub supply line and does not flow through a shower supply line. Fluid may flow from the pressure balance valve outlet 104, through the channel 106, into the pressure balance valve manifold outlet 92, around the outside of second portion 99 of the venturi 95, and out of the outlet 92. During use, the force created of air pressure on the first portion 97 of the venturi 95 may be greater than the force from the fluid on the second portion 99 which prevents fluid from flowing through the venturi 95 to the shower supply line. The seal between the first portion 97 and the outlet 92 may prevent fluid from flowing around the outside of the venturi 95 and into the shower supply line. A diverter switch (not shown) in the tub supply line may be activated such that fluid flow is prevented through the tub supply line. The diverter may cause fluid to fill a portion of the tub supply line. As fluid continues to flow from the outlet 92, the fluid may flow from the blocked tub supply line through the venturi 95 from the second portion 99 to the first portion 97 and to the shower supply line.

Figure 12:
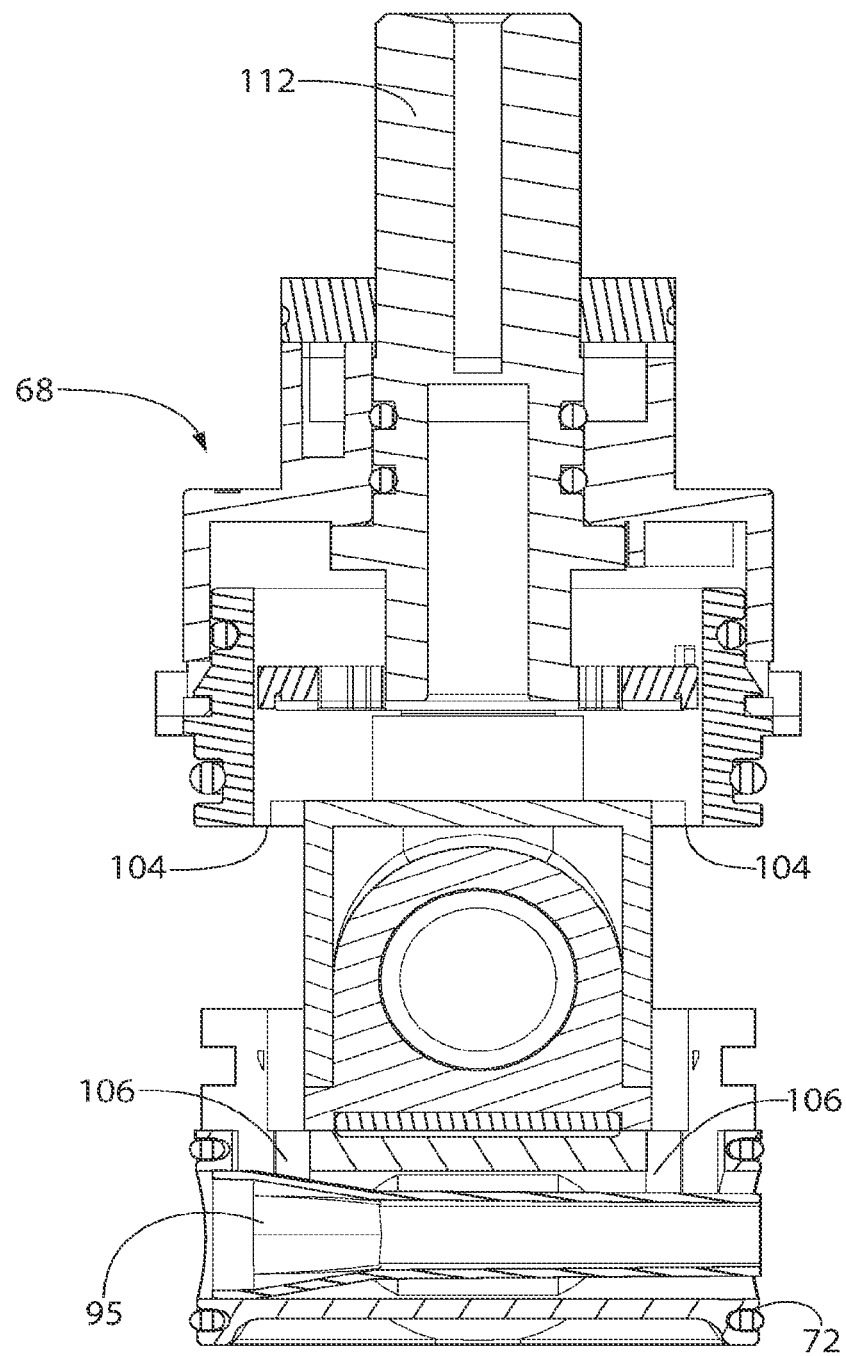
FIG. 12 is a sectional view of the pressure balance valve and pressure balance valve manifold taken along a plane defined by line D-D of FIG. 1.
Figure 13:
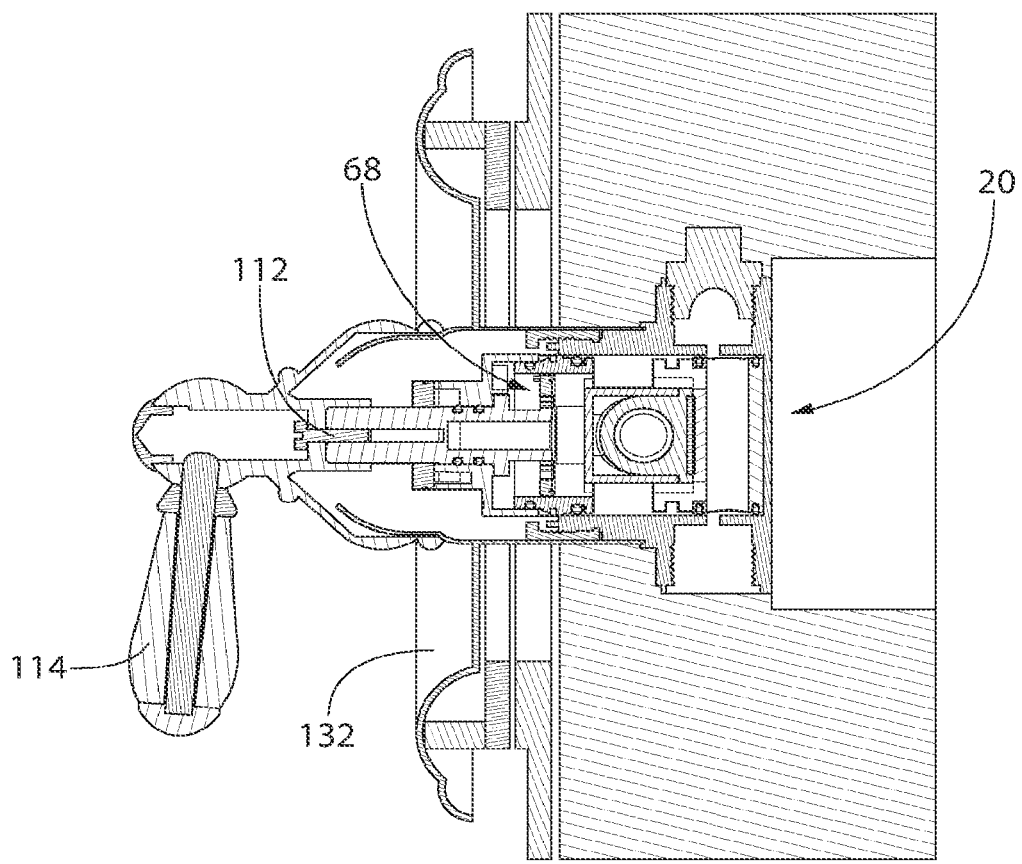
FIG. 13 is a sectional view of the pressure balance valve taken along a plane defined by line D-D of FIG. 1 shown installed in a shower wall.

Referring to FIGS. 12-13 and 36, the pressure balance valve 68 may include a spindle 112 adapted to be coupled to a handle 114. The handle 114 may allow a user to activate the flow of water through the pressure balance valve 68 and select the flow through the first inlet 22 and the second inlet 24 (e.g., by rotating the handle). In one embodiment, selecting the flow through the first inlet 22 and the second inlet 24 alters the temperature of the fluid which flows through the outlet 92. The spindle 112 may include an opening 121 defined by an inner wall 115. The spindle 112 may include an outer wall 117 and the outer wall may include grooves or reliefs. A limiter 123 may include a corresponding feature to engage the grooves. The limiter 123 may limit the maximum rotation of the spindle 112. One or more spokes 119 may extend between the inner wall and the outer wall 117. At least one of the spokes may have a thickness greater than the thickness of another spoke.

In some embodiments, limiting the maximum percentage of hot water that can flow from the rough-in valve may prevent scalding (e.g., at an elementary school). The limiter 123 may include an indicator 125 (e.g., symbols, numbers, or letters) that provides a reference when installing the limiter 123 on the mixing cartridge. The mixing valve may include indicator 127 (e.g., groove or protrusion) and the limiter 123 may include a second indicator 129 (e.g., groove or protrusion). Aligning indicator 125, indicator 127, and second indicator 129 with the thickest spoke 119 may allow for a selected percentage of hot water (e.g., 100%) to flow from the rough-in valve 20. A user (e.g., installer) may offset the indicator 125 from the thickest spoke 119 to reduce the maximum percentage of hot water that can flow through the mixing cartridge (e.g., 90%, 80%, 70%, or 60%) even when the user turns the handle to full hot.

Figure 16:
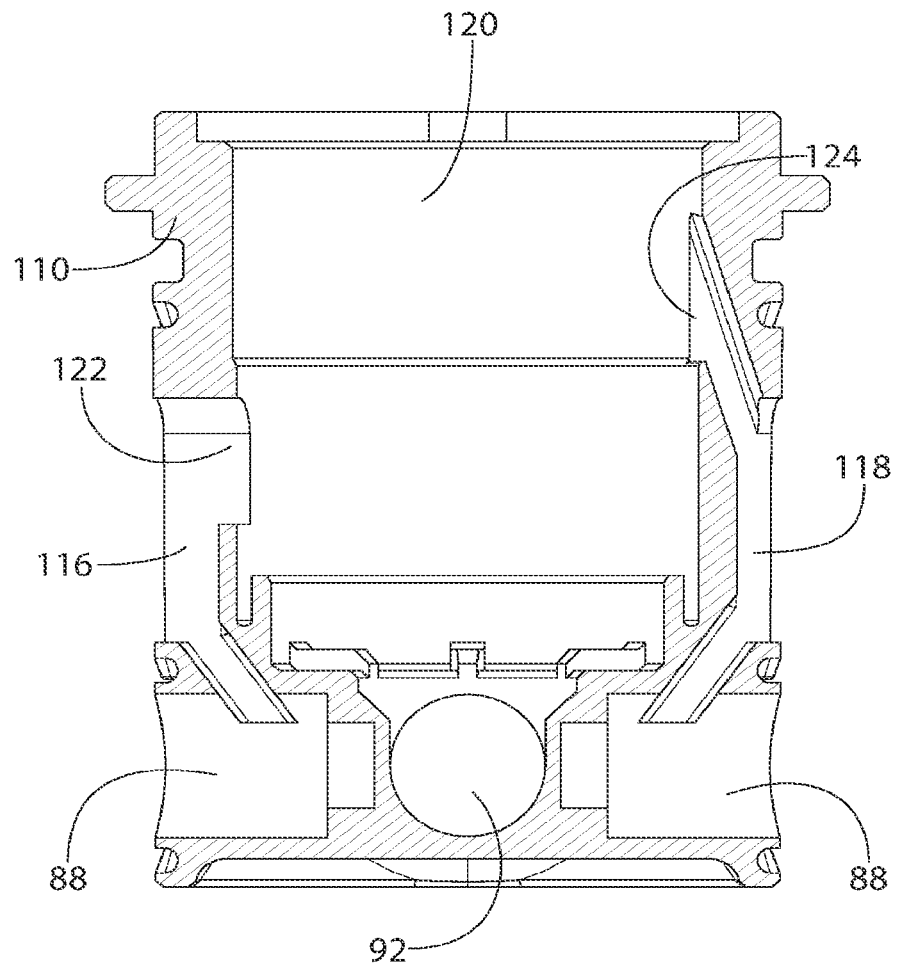
FIG. 16 is a sectional view of the thermostatic valve manifold of FIG. 14 taken along a plane defined by line E-E in FIG. 15.

Referring to FIGS. 14-17, a thermostatic valve manifold 110 may be adapted to receive the thermostatic valve 70. The thermostatic valve 70 may be adapted to regulate the temperature of the fluid which flows out of the outlet 92. The thermostatic valve manifold 110 and thermostatic valve 70 may be adapted to be received in the valve chamber 34. The thermostatic valve manifold 110 may include a cavity 120 configured to receive at least a portion of the thermostatic valve 70. The thermostatic valve manifold 110 may include the outlet 92 and the inlets 88 as previously described. However, the inlets 88 of the thermostatic valve manifold 110 may include a first transition 116 in fluid communication with one inlet and a second transition 118 in fluid communication with a second inlet (FIG. 16). The first transition 116 may include a first entry 122 into the cavity 120. The second transition 118 may include a second entry 124 into the cavity 120. The first entry 122 may be below the second entry 124. The first entry 122 and the second entry 124 may be on opposing sides of the cavity 120. The first entry 122 and second entry 124 may each be aligned with an opening in the thermostatic valve 70 (not shown) configured to receive a flow of fluid. At least one of the first transition 116 and the second transition 118 may be open to an external portion of the thermostatic valve manifold 110 at one or more locations along the length of the first transition 116 or the second transition 118 such that fluid may flow between the thermostatic valve manifold 110 and a sidewall of the valve chamber 34 as the fluid flows from the inlet 88 to the outlet 92.

Figure 17:
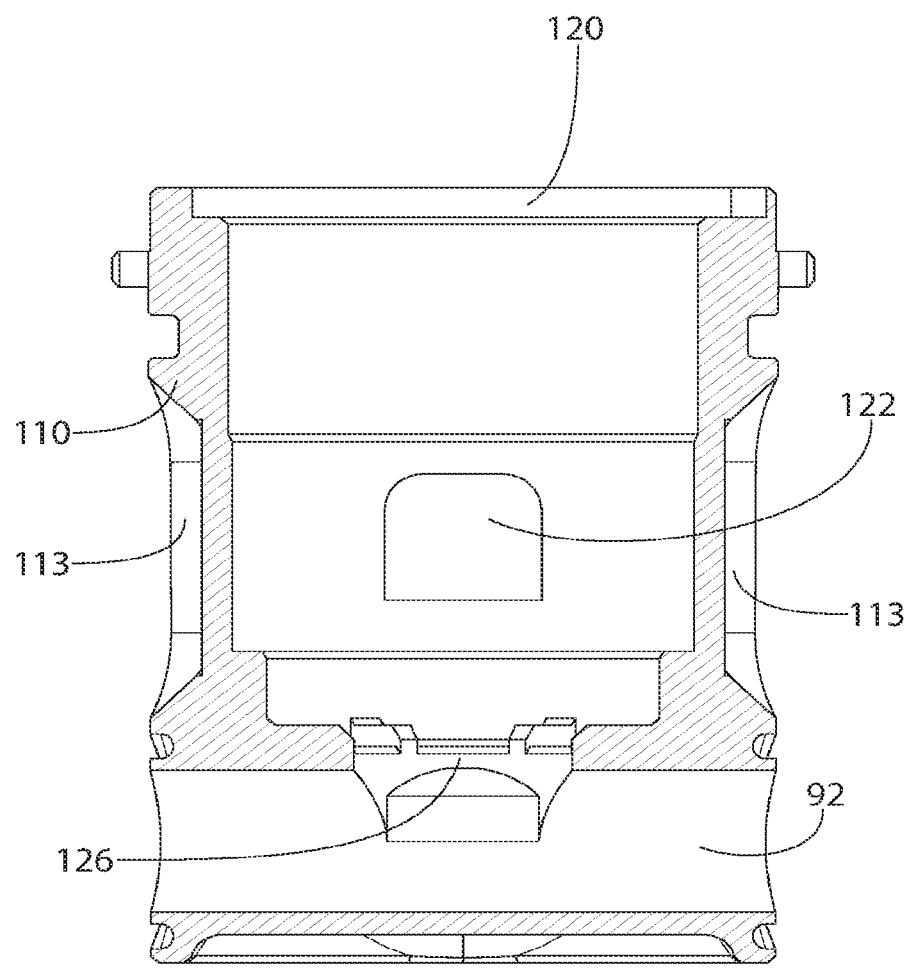
FIG. 17 is a sectional view of the thermostatic valve manifold of FIG. 14 taken along a plane defined by line F-F in FIG. 15.
Figure 18:
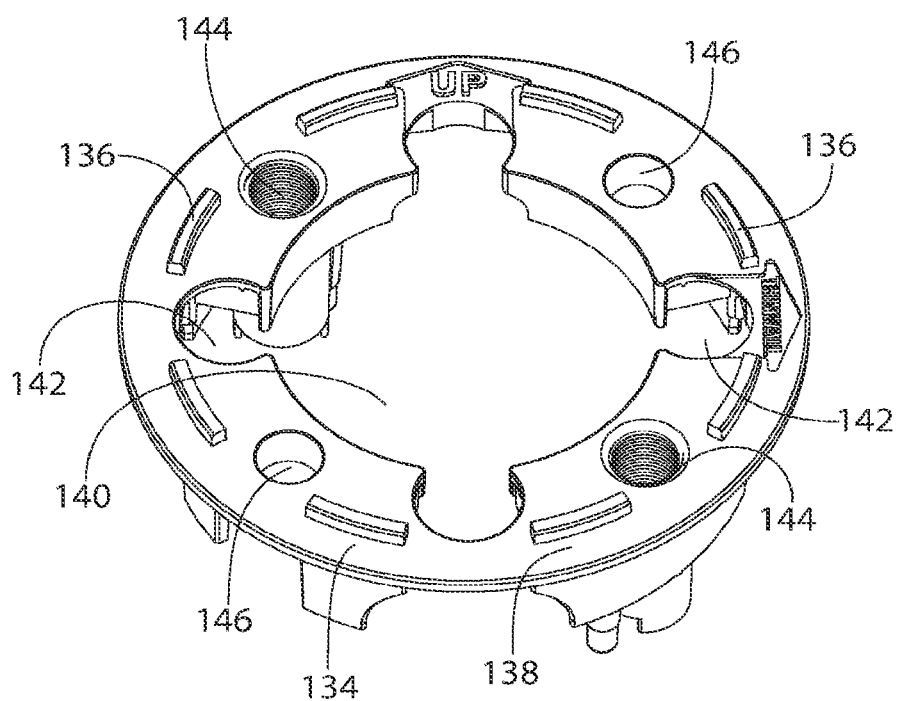
FIG. 18 is a front perspective view of a guide in accordance with one embodiment of the present invention.

Still referring to FIGS. 14-17, the thermostatic valve manifold 110 may include an outer wall 111 having a plurality of depressions 113. In one embodiment, the depressions 113 reduce the thickness of the wall of the thermostatic valve manifold 110 thereby reducing the material cost for the thermostatic valve manifold 110 as compared to a thermostatic valve manifold that does not include the depressions. The thermostatic valve manifold 110 may include the outlet 92 and a thermostatic valve manifold passageway 126 which provides fluid communication between the thermostatic valve 70 and the outlet 92 (FIG. 17). The thermostatic valve 70 may include a centrally located outlet (not shown) on the bottom of the thermostatic valve 70 such that fluid flows from the bottom of the thermostatic valve 70, through the thermostatic valve manifold passageway 126, and out of the outlet 92.

Figure 2:
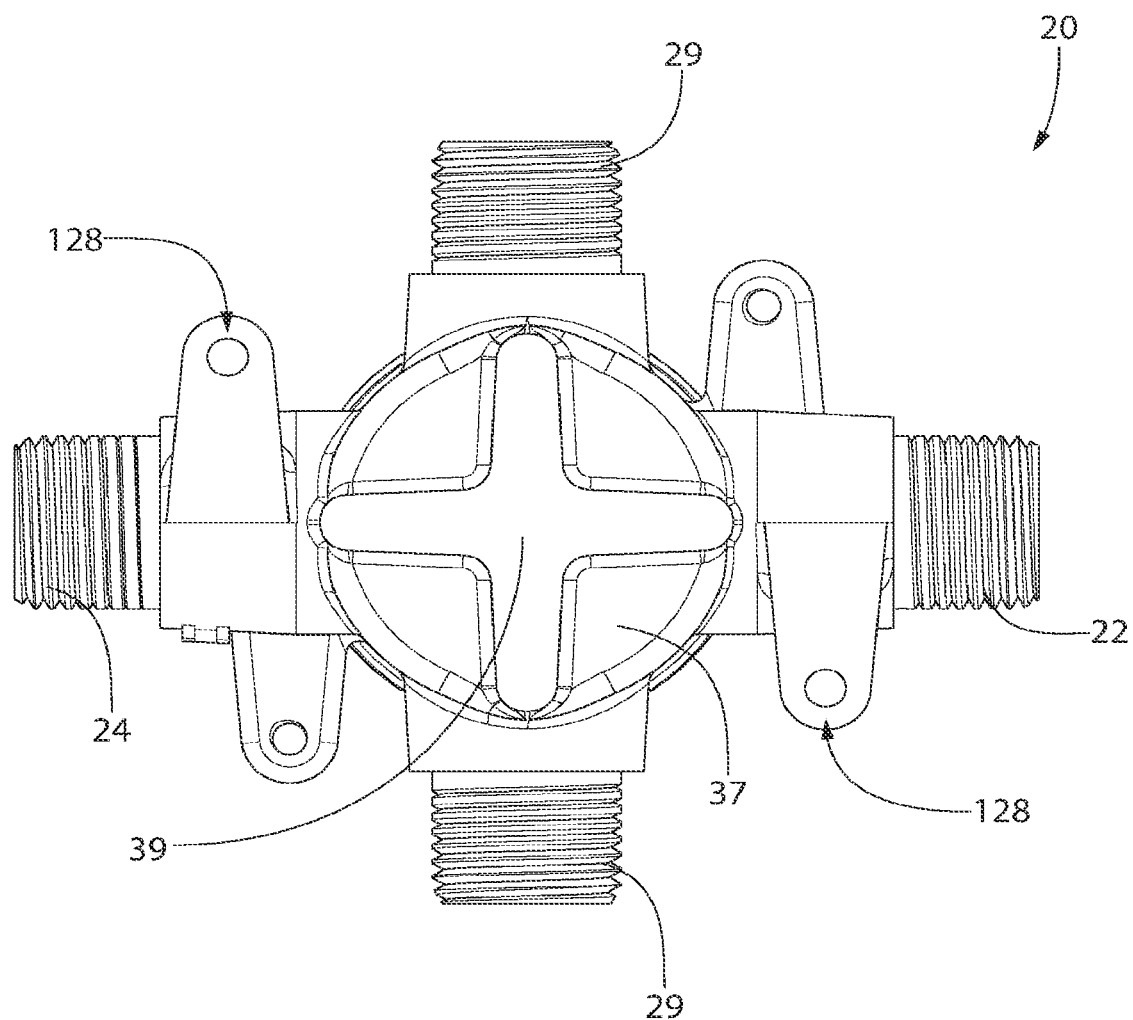
FIG. 2 is a rear elevation view of the rough-in valve of FIG. 1.

Referring to FIGS. 2-3 and 13, the rough-in valve 20 may include an anchor 128 adapted to secure the rough-in valve 20 to a substrate (e.g., a 2×4 wall stud or cross brace between wall studs). The anchor 128 may be adapted to receive a fastener (e.g., a nail or screw). The rough-in valve 20 may include a receiver 130 adapted to receive a fastener (e.g., a screw) to couple a faceplate 132 to the rough-in valve 20. In one embodiment, the rough-in valve 20 is positioned inside of a wall and the faceplate 132 (FIG. 13) is positioned on the outside of a wall (e.g., a shower wall). The rough-in valve 20 may include a rear surface 37 adapted to be positioned adjacent a substrate (FIG. 13). In one embodiment, the rear surface 37 includes a flat surface that sits flush against a substrate. In other embodiments, the rear surface 37 includes a protrusion 39 on the rear surface 37 (FIG. 2) and the protrusion sits flush against the substrate. The protrusion 39 may space the inlet (e.g., first inlet 22) and/or outlet 29 from the substrate which the rough in valve 20 is coupled to such that a tool (e.g., a crimping tool, a wrench) can engage a connector (e.g., pex connector or nut) after the rough-in valve 20 is coupled to the substrate. The protrusion 39 may protrude from the rear surface 37 by a distance of about 1 millimeter, about 2 millimeters, about 3 millimeters, about 4 millimeters, about 5 millimeters, about 6 millimeters, about 7 millimeters, about 8 millimeters, about 9 millimeters, about 10 millimeters, about 1 millimeter to about 3 millimeters, about 3 millimeters to about 5 millimeters, about 5 millimeters to about 7 millimeters, about 7 millimeters to about 9 millimeters, or about 9 millimeters to about 11 millimeters. The rear surface of the protrusion 39 may be coplanar or flush with the rear surface of the anchors 128

Figure 40:
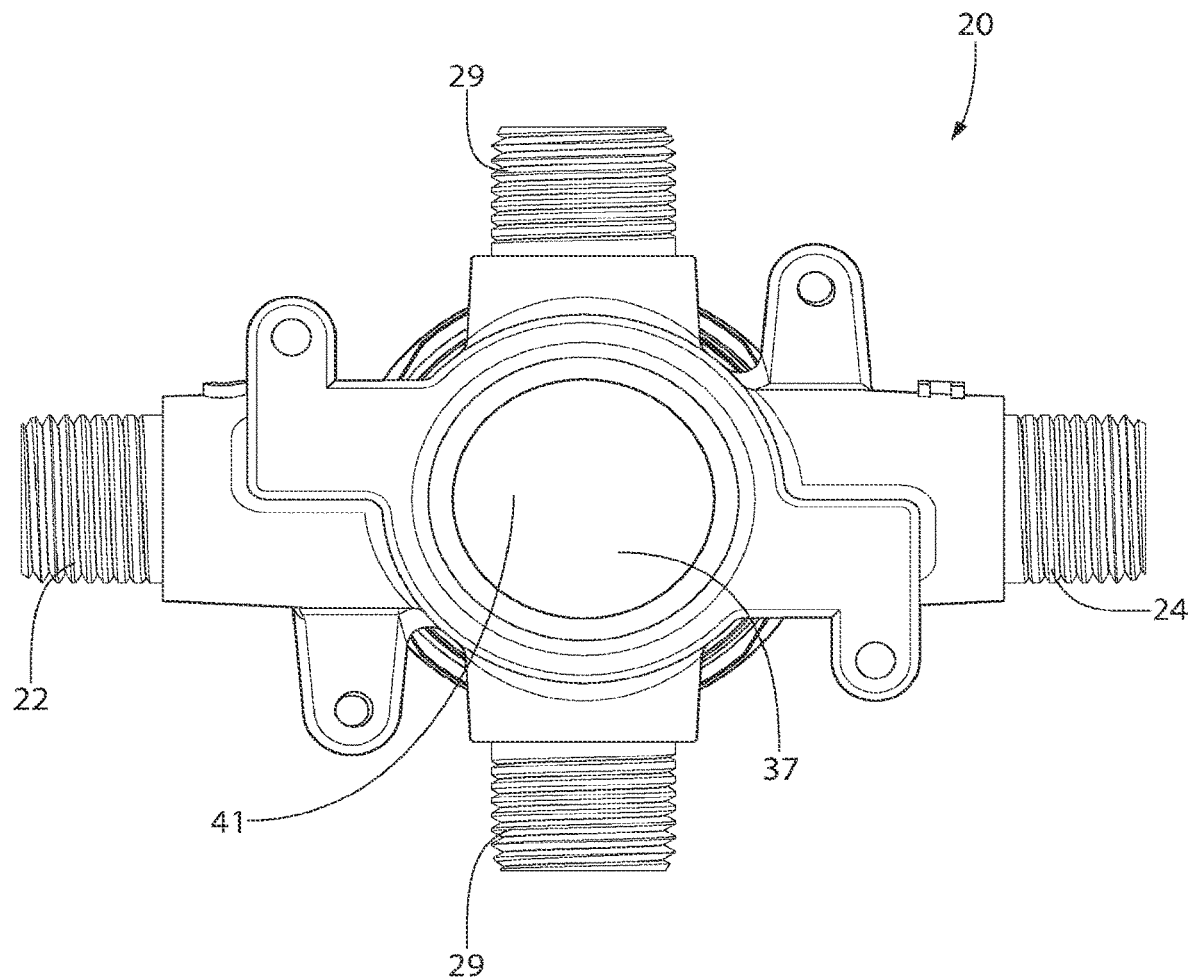
FIG. 40 is a rear elevation view of a rough-in valve in accordance with another exemplary embodiment of the present invention.

In some embodiments, the rear surface 37 may include a depression 41 (FIG. 40). The portion of the rear surface 37 that defines the edge of the depression 41 may be flush with the rear surface of the anchors 128. The depression 41 may have a depth of about 1 millimeter, about 2 millimeters, about 3 millimeters, about 4 millimeters, about 5 millimeters, about 6 millimeters, about 7 millimeters, about 8 millimeters, about 9 millimeters, about 10 millimeters, about 1 millimeter to about 3 millimeters, about 3 millimeters to about 5 millimeters, about 5 millimeters to about 7 millimeters, about 7 millimeters to about 9 millimeters, or about 9 millimeters to about 11 millimeters.

A rear surface of the anchor 128 may be co-planar with the rear surface 37 of the rough-in valve 20. In one embodiment, a flat rear surface allows a user to temporarily hold the rough-in valve 20 flush against the substrate with one hand while installing a fastener to the anchor 128 to fix the rough-in valve 20 to the substrate. In one embodiment, the rear surface of the anchor 128 is the rear-most surface of the rough-in valve 20. In one embodiment, the anchor 128 being flush against the substrate prevents the rough-in valve 20 from rotating or tipping as a fastener is inserted through the anchor 128 and coupled to the substrate.

The rough-in valve 20 may be positioned within walls of different wall thicknesses (e.g., acrylic showers have a thin wall compared to tile shower walls). Referring to FIGS. 18-20 and 23-27, there is shown a guide 134 adapted to occupy the space between rough-in valve 20 and a wall surface such that the rough-in valve 20 is coupled to the wall surface. In one embodiment, a user may selectively adjust the thickness of the guide 134 relative to the wall and the rough-in valve 20 by rotating the guide 134 to align the selected one of the thick wall receiver opening 144 and the thin wall receiver opening 146 with the receiver 130 on the rough-in valve 20. In one embodiment, the thickness of the guide 134 extending between the wall and the rough-in valve 20 may be adjustable during installation to fit the distance between the wall and the rough-in valve 20 such that a portion of the pressure balance valve 68 or thermostatic valve 70 extends an appropriate distance through the opening and away from a user facing surface for the handle 114 to be coupled thereto. The guide 134 may include tabs 136 which, in one embodiment, are arranged in a circular pattern (e.g., a 3.5 inch diameter circle or a 4 inch diameter circle) to assist in aligning the guide 134 within a shower wall opening 135 (e.g., a 3.5 inch hole in the shower wall or a 4 inch hole). The guide 134 may abut a wall (e.g., a rear surface 137 of a wall 139) (FIG. 24) such that the rough-in valve 20 is positioned within the wall opening 135 such that a portion of the pressure balance valve 68 or thermostatic valve 70 extends an appropriate distance through the wall opening and away from a user facing wall surface for the handle 114 to be coupled thereto.

The guide 134 may include a main opening 140 adapted to receive the valve chamber 34 of the rough-in valve 20. The guide 134 may include one or more second openings 142 adapted to allow access to the service stops 40 when the guide 134 is coupled to the rough-in valve 20. The guide 134 may include thick wall receiver openings 144 and thin wall receiver openings 146 each adapted to be aligned with the receiver 130 of the rough-in valve 20 depending on the wall thickness during installation. Each of the thin wall receiver openings 146 and thick wall receiver openings 144 are adapted such that a fastener can be inserted through the selected receiver opening and into the receiver 130 of the rough-in valve 20. In one embodiment, the thick wall receiver openings 144 and/or thin receiver openings 146 are conical to assist in aligning the fasteners with the receiver 130. The guide 134 may include a sidewall 152 with thin wall recess 155 and thick wall recess 154 (FIG. 19) adapted to receive the first inlet 22, second inlet 24, and the outlets 29. The thin wall recess 155 and thick wall recess 154 may be different heights to accommodate for different wall thicknesses which may affect the distance between the inlets and outlets and the surface of the guide 134.

Figure 19:
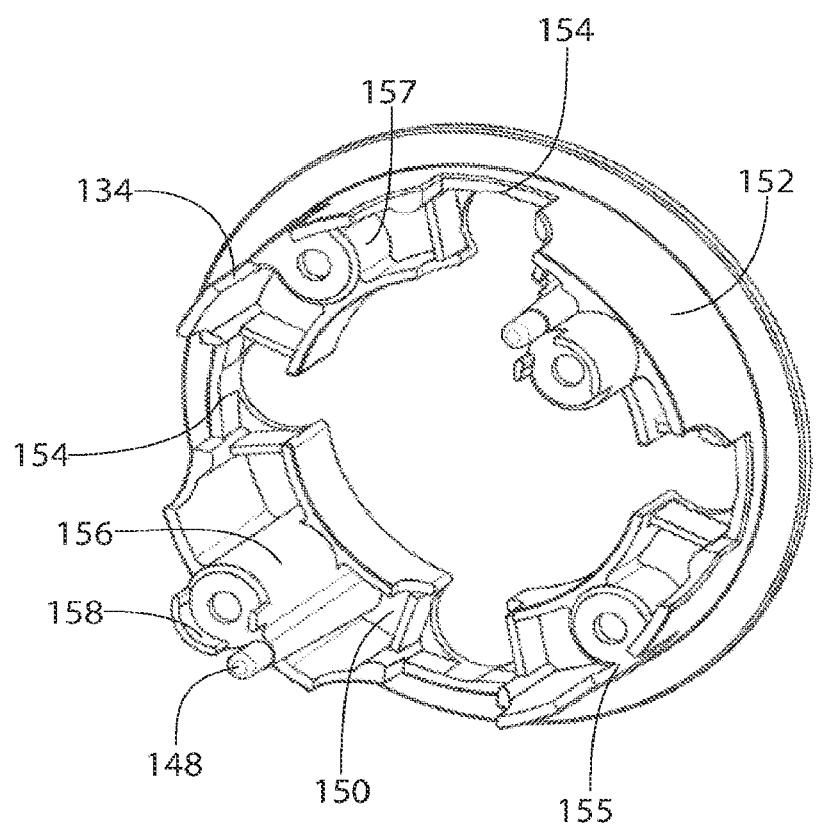
FIG. 19 is a rear perspective view of the guide of FIG. 18.
Figure 20:
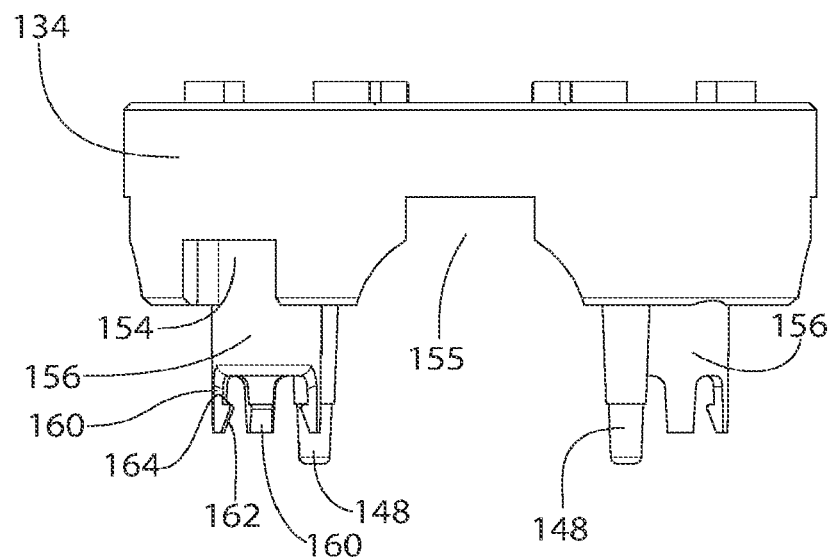
FIG. 20 is a side view of guide in accordance with another embodiment of the present invention.

Referring to FIGS. 19-20, in one embodiment, the thick wall receiver opening 144 includes a sleeve 156 extending from a rear surface 150 of the guide 134 and the thin wall receiver opening 146 includes a thin wall sleeve 157. In one embodiment, the sleeve 156 extends further from the surface of the guide 134 than the thin wall sleeve 157. In one embodiment, the sleeve 156 includes an extension 158 (e.g., a semicircular extension) adapted to engage a portion of the receiver 130 (e.g., an outer wall of the receiver 130) to assist in aligning the guide 134 with the rough-in valve 20. In one embodiment, the extension 158 includes an arcuate portion having an arc length of about 15 mm to about 20 mm. In one embodiment, the end of the sleeve 156 may include prongs 160, instead of the extension 158, adapted to receive the receiver 130 of the rough-in valve 20. The prongs 160 may include a sloped surface 162 adapted to cause the prong 160 to deflect as the sloped surface 162 engages the receiver 130 (FIG. 13). The prong 160 may include a shoulder 164 that engages a rear surface of the receiver 130 to secure the guide 134 to the rough-in valve 20. In one embodiment, the prongs 160 are frangible. In one embodiment, the guide 134 is intended to be removed from the rough-in valve 20 after installation and the user may break the prongs 160 from the guide 134 by applying a force (e.g., pulling) to the guide 134. In one embodiment, the guide 134 is intended to remain coupled to the rough-in valve 20 after installation.

The guide 134 may include a projection 148 extending from a rear surface 150 of the guide 134. In one embodiment, the rear end of the projection 148 is position within the opening of the receiver 130 to secure the guide 134 to the rough-in valve 20.

Figure 21:
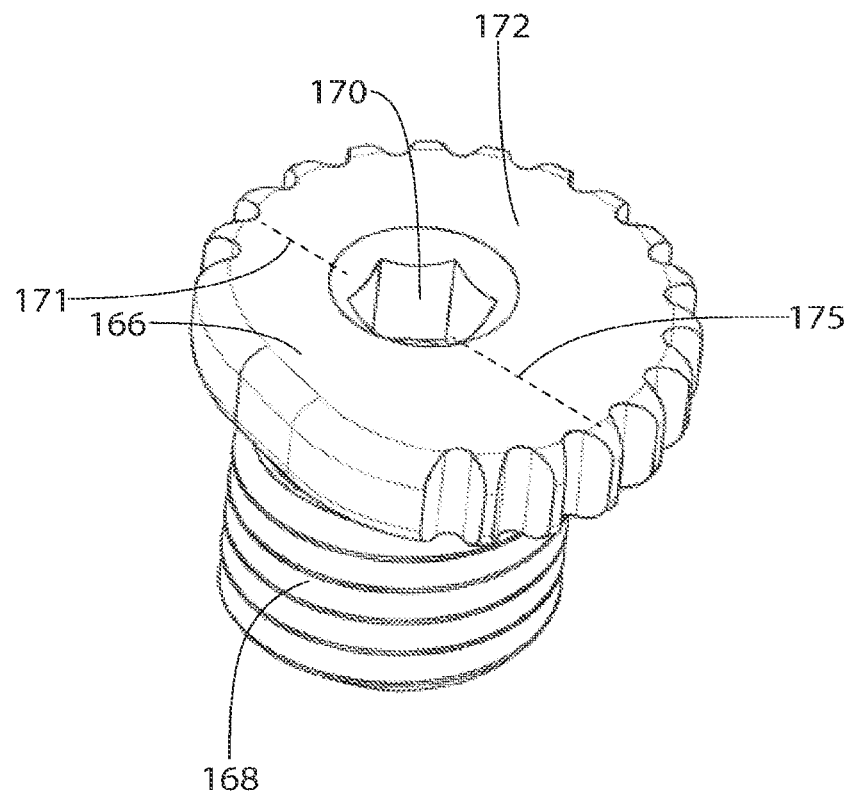
FIG. 21 is a top perspective view of an eccentric fastener in accordance with one embodiment of the present invention.
Figure 22:
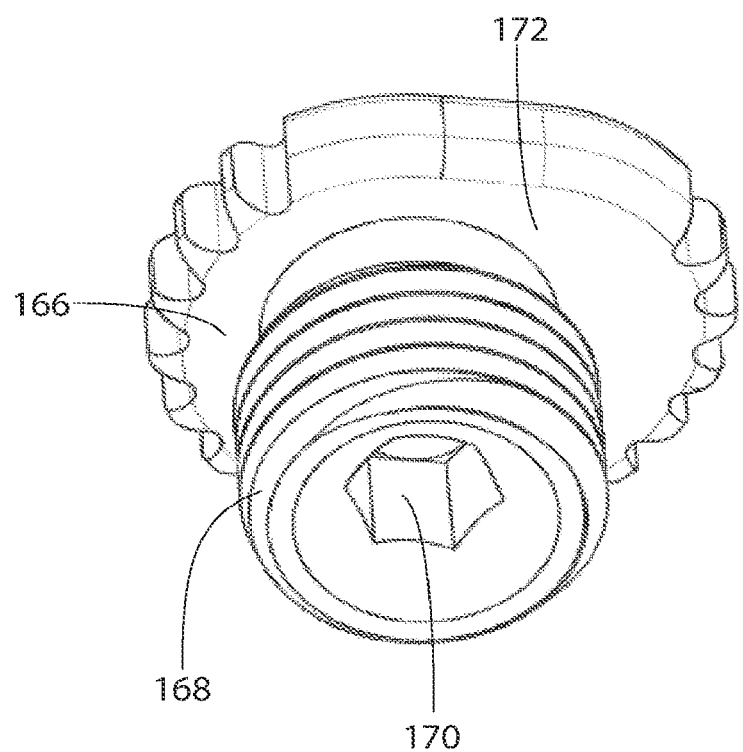
FIG. 22 is a bottom perspective view of the eccentric fastener of FIG. 21.
Figure 23:
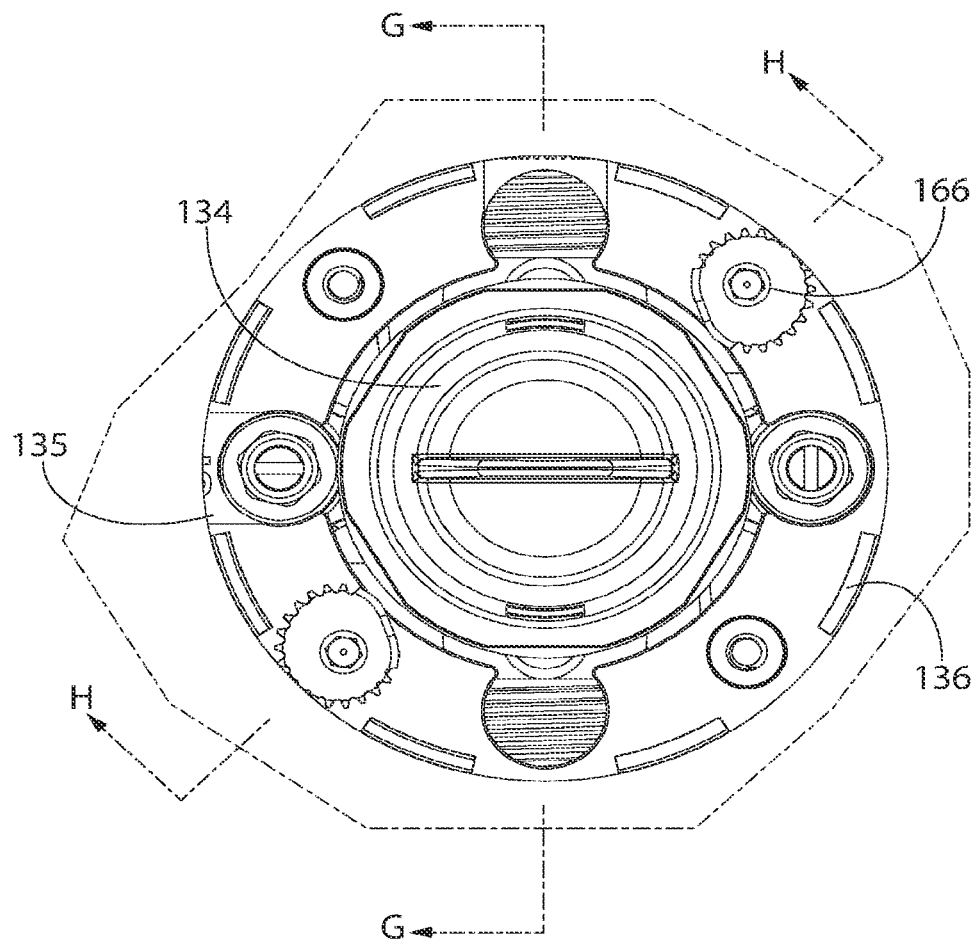
FIG. 23 is top view of the guide of FIG. 18 with the eccentric fastener of FIG. 21 and the rough-in valve of FIG. 1 in a wall opening.
Figure 24:
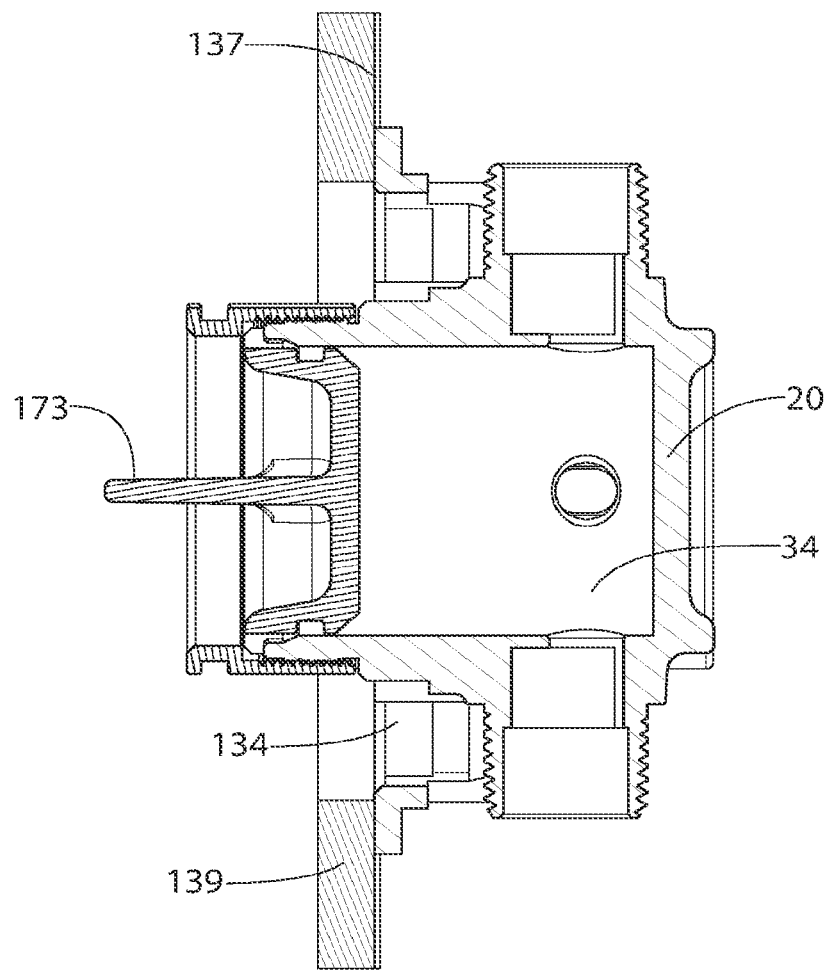
FIG. 24 is a sectional view of the guide and rough-in valve of taken along a plane defined by line G-G of FIG. 23.
Figure 25:
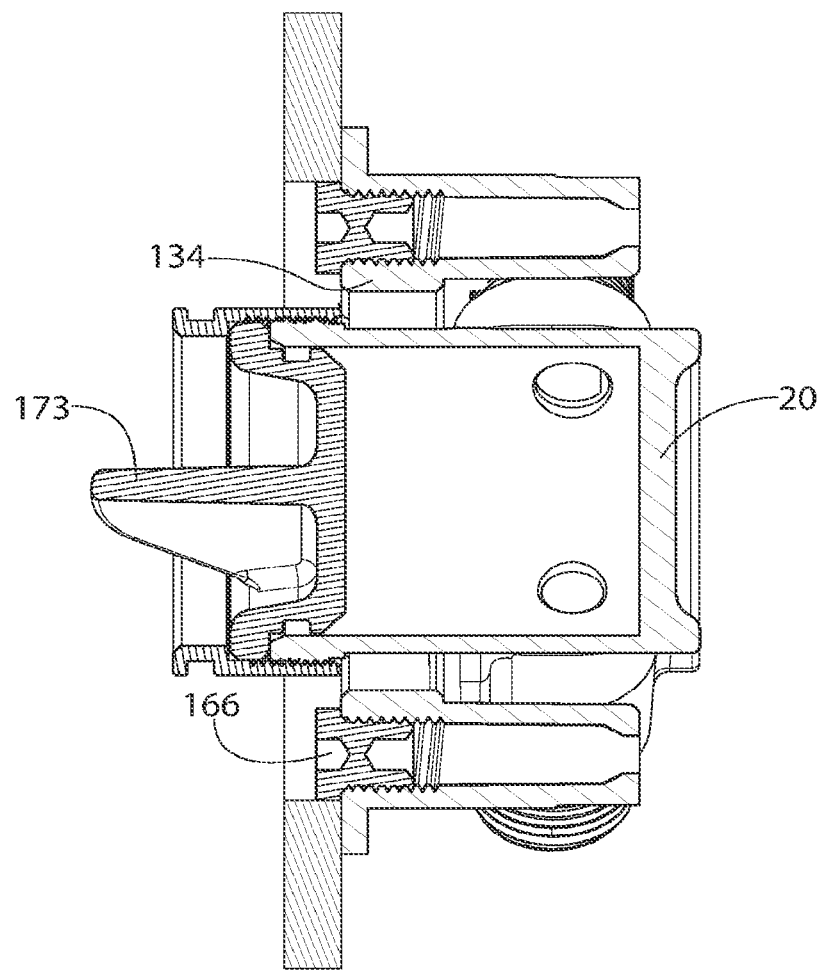
FIG. 25 is a sectional view of the guide and rough-in valve of taken along a plane defined by line H-H of FIG. 23.

Referring to FIGS. 18 and 21-25, in one embodiment, the thick wall receiver opening 144 is threaded to receive a threaded fastener (e.g., a screw or bolt). In one embodiment, the thick wall receiver opening 144 is adapted to receive an eccentric fastener 166 (FIGS. 21-22). In one embodiment, both the thick wall receiver opening 144 and the thin wall receiver opening 146 are threaded (not shown). In one embodiment, neither the thick wall receiver opening 144, nor the thin wall receiver opening 146, are threaded. In one embodiment, one of the thick wall receiver opening 144 and the thin wall receiver opening 146 is threaded and the other is not.

Still referring to FIGS. 21-25, the eccentric fastener 166 may include a threaded body 168 to engage the threaded thick wall receiver opening 144. The eccentric fastener 166 may include a tool engagement feature 170 such that the eccentric fastener 166 can be rotated by a tool (not shown but could be an Allen wrench, screw driver, or socket wrench, for example) when the guide 134 is coupled to the rough-in valve 20. In one embodiment, the eccentric fastener 166 may be rotated from the front or back of the eccentric fastener 166. A head 172 of the eccentric fastener 166 may include a serrated outer surface adapted to grip the sides of the wall opening 135 to assist in securing the guide 134 to the wall. The eccentric fasteners 166 may include a cam surface on the head 172 such that the eccentric fasteners 166 may be rotated to exert a radial force on the sides of the wall opening 135 to secure the guide 134 to the wall. In one embodiment, the cam surface includes a major radius 175 and a minor radius 171. In one embodiment, the major radius has a length of about 7 mm to about 12 mm. In one embodiment, the minor radius 171 has a length of about 5 mm to about 9 mm.

Figure 26:
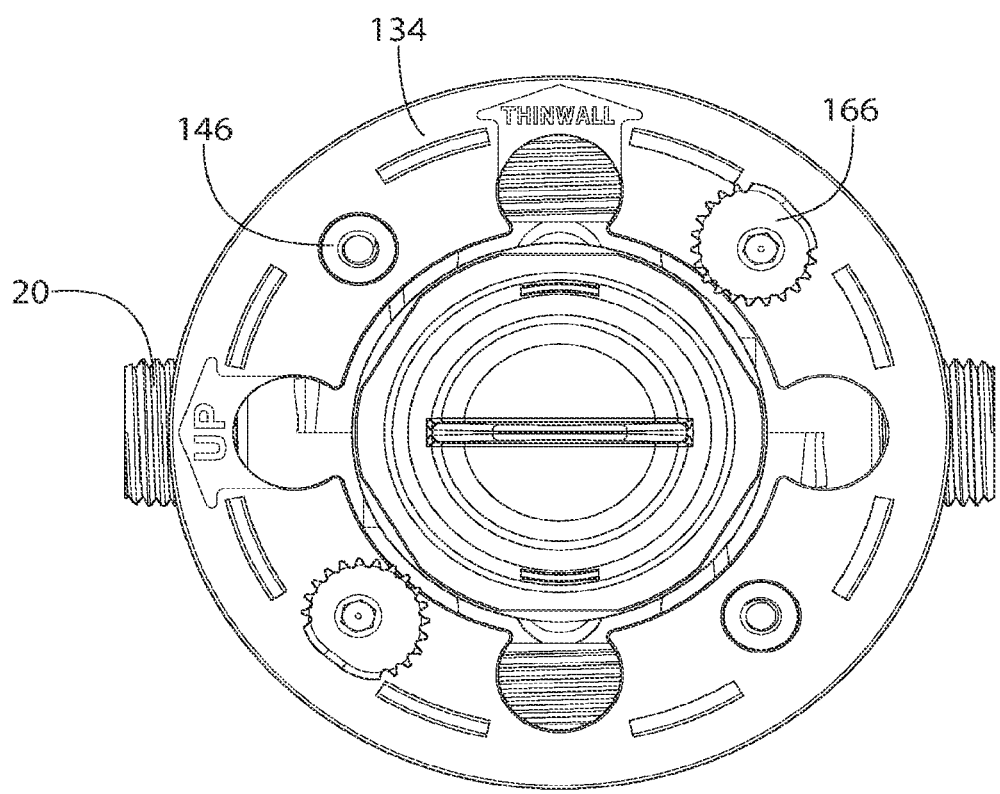
FIG. 26 is a front elevational view of the rough-in valve of FIG. 1 coupled to the guide of FIG. 18.
Figure 27:
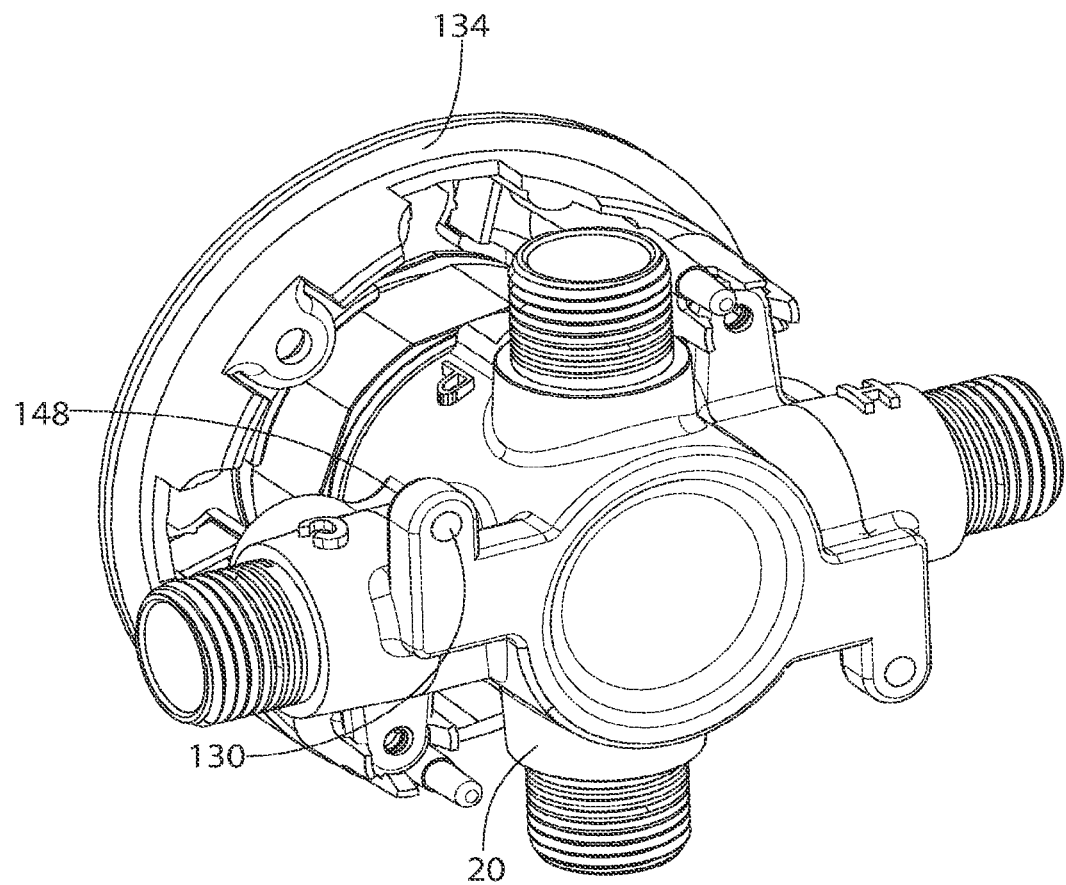
FIG. 27 is a rear perspective view of the rough-in valve of FIG. 1 coupled to the guide of FIG. 18.

The valve chamber 34 of the rough-in valve 20 may receive a cover 173 to prevent debris from entering the valve chamber during installation of the rough-in valve 20. The cover 173 may also allow the rough-in valve 20 to be pressure tested after installation. In one embodiment (not shown), the guide includes a bellows such that the guide may expand or contract to occupy the space between the rough-in valve 20 and the wall. In other embodiments, the guide may include two pieces (not shown) that are threadingly engaged such that the guide may expand or contract. In other embodiments (not shown), the guide may include multiple pieces nested within each other such that the guide may telescopically expand or contract. In one embodiment, the guide 134 may have a cammed rear surface or a plurality of different length projections from a rear surface such that the distance the front surface of the guide 134 extends from the rough-in valve 20 may be selected by rotating the guide 134 relative to the rough-in valve 20 before coupling the guide 134 with the rough-in valve 20. Referring to FIGS. 26-27, the guide 134 may be coupled to the rough-in valve 20. The eccentric fastener 166 may be positioned in the thick wall receiver opening 144 when the guide 134 is coupled to the rough-in valve 20 via the thin wall receiver opening 146.

Figure 37:
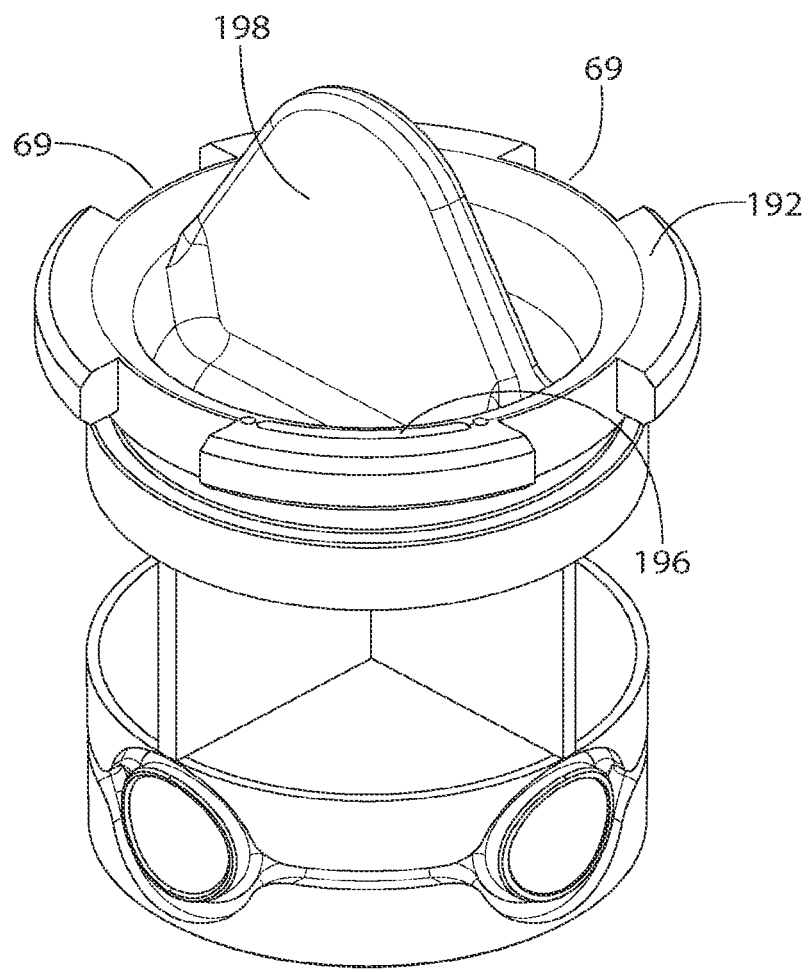
FIG. 37 is a perspective view of a flush plug.
Figure 38:
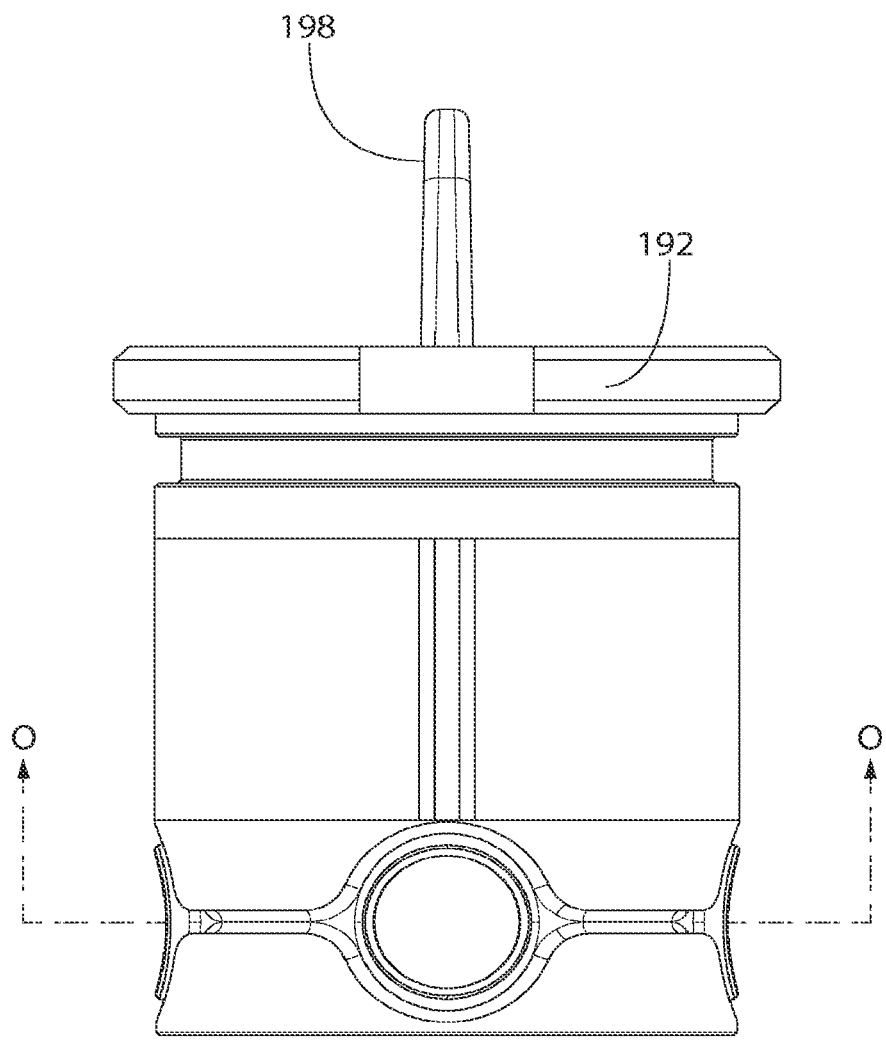
FIG. 38 is a side elevation view of the flush plug of FIG. 37.
Figure 39:
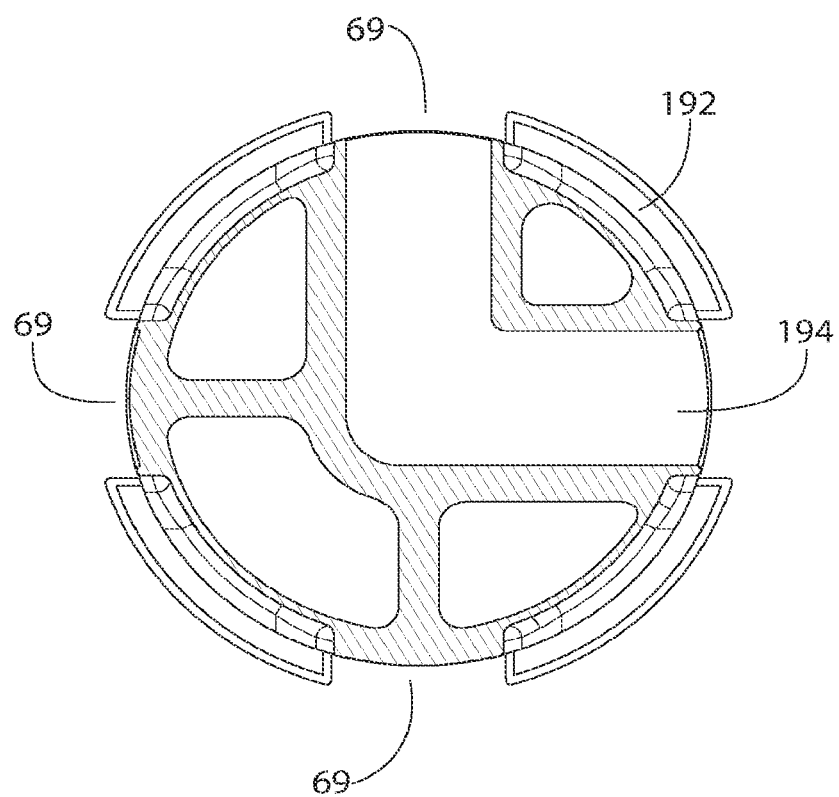
FIG. 39 is a bottom sectional view of the flush plug of FIG. 38 along a plane defined by line O-O.

Referring to FIGS. 37-39, a flush plug 192 may be configured to be coupled to the rough-in valve 20 during or after installation of the rough-in valve 20. The flush plug 192 may be configured to be positioned in the valve chamber 34 to prevent debris from entering the valve chamber 34 similar to the cover 173. The flush plug 192 may extend toward an end of the valve chamber 34 and the flush plug 192 may include a channel 194 (FIG. 39) configured to fluidly connect one of the first inlet 22 and the second inlet 24 to one of the outlets 29 (FIG. 3). The flush plug 192 may be selectively positioned in the valve chamber 34 such that a desired inlet may be coupled to a desired outlet. In one embodiment, fluidly coupling an inlet to an outlet may allow the flow of fluid to remove dirt, solder, or debris from the selected inlet or outlet. In one embodiment, the flush plug 192 includes one or more recesses 69 (FIG. 39) configured to receive the tab 82 (FIG. 3) on the rough-in valve 20 to prevent undesired rotation of the flush plug 192 relative to the rough-in valve 20. In other embodiments, the recesses are detents that provide tactile feedback to the user that the channel 194 is aligned with an inlet and an outlet but still allows the flush plug 192 to be rotated relative to the rough-in valve 20 while the flush plug 192 is fully (or substantially fully) seated in the valve chamber 34 (e.g., without the need partially or fully decouple the cap 84 from the rough-in valve 20). The flush plug 192 may include an indicator 196 that indicates which of the inlets and outlets are connected by the channel 194. The flush plug 192 may include a handle 198 configured to be engaged by a user to rotate the flush plug 192 relative to the rough-in valve 20. In some embodiments, the flush plug 192 is configured to couple to one of the pressure balance valve manifold 72 and the thermostatic valve manifold 110.

Figure 28:
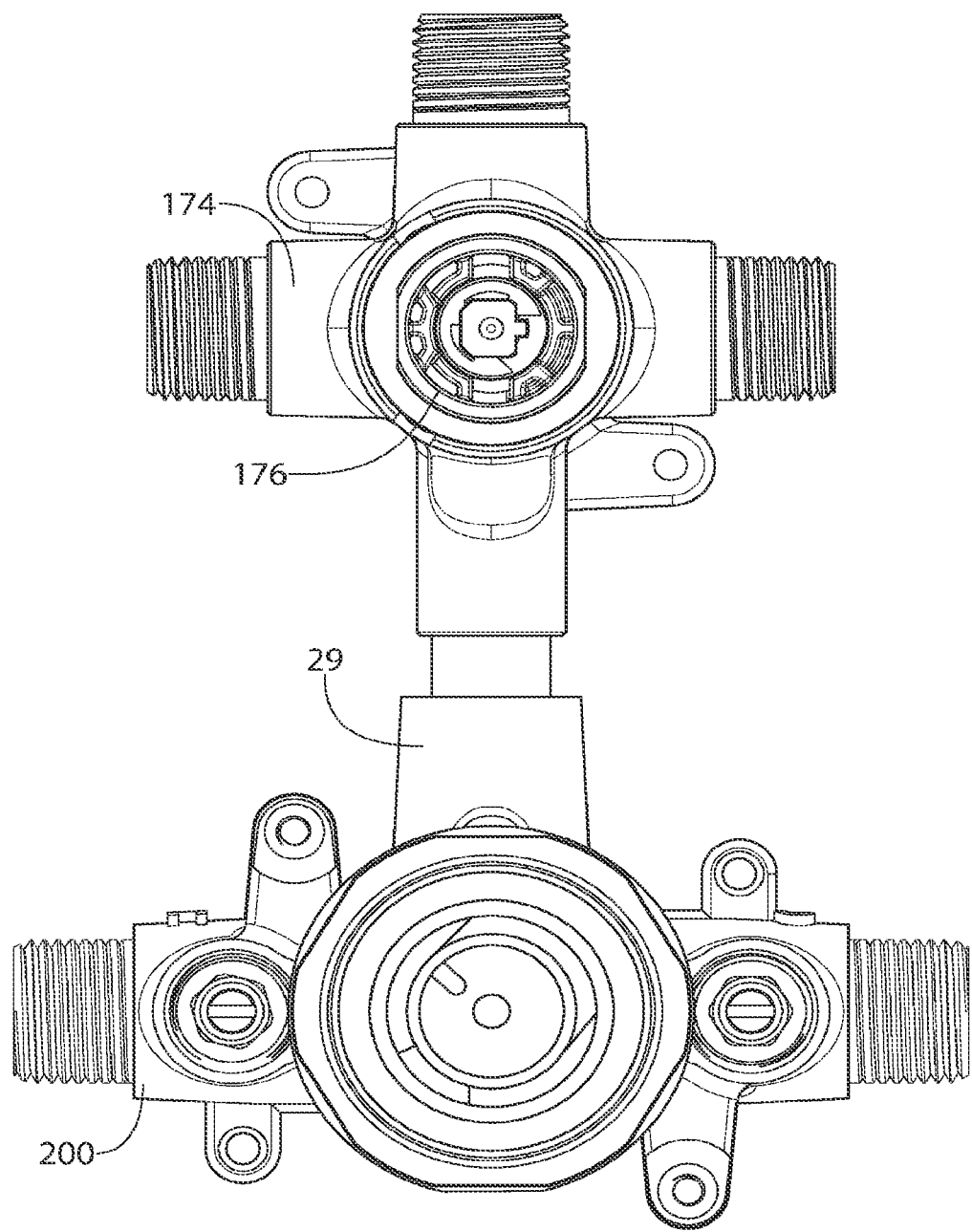
FIG. 28 is a front elevation view of the rough-in valve of FIG. 1 and a diverter rough-in valve in accordance with one embodiment of the present invention.

Referring to FIGS. 28, another embodiment of a rough-in valve, generally designated 200, is shown. The rough-in valve 200 is similar to rough-in valve 20, but rough-in valve 200 includes a single outlet 29. The outlet 29 of the rough-in valve 200 may be coupled to a diverter rough-in valve 174. The diverter rough-in valve 174 may be adapted to receive a diverter valve 176 to allow a user to select which outlet the fluid will flow from (e.g., a tub or a shower). The diverter rough-in valve 174 may have a similar external shape to the rough-in valve 20 but the diverter rough-in valve 174 may not include the service stop openings 42. In another embodiment, the diverter rough-in valve 174 includes the openings 42 and service stops 40 as previously described.

In one embodiment, a kit may include the rough-in valve 20 with one of the pressure balance valve 68 and the thermostatic valve 70 pre-installed in the rough-in valve 20 with the corresponding manifold. The kit may include the faceplate 132, the guide 134, the ring 188, the flush plug 192, or the eccentric fastener 166. In one embodiment, the rough-in valve 20 is commercially available as a stand-alone unit. In one embodiment, the kit also includes the flush plug 196. In one embodiment, the flush plug 192 is commercially available as a stand-alone unit.

In a first embodiment, a universal rough-in valve comprises:
  a valve chamber configured to receive a valve manifold;
  a first valve inlet configured to provide a pathway for fluid from a first supply line to the valve chamber;
  a second valve inlet configured to provide a pathway for fluid from a second supply line to the valve chamber;
  a first valve outlet configured to provide a pathway for fluid from the valve chamber to a first outlet line; and
  a valve manifold removably positioned in the valve chamber and configured to receive a fluid mixing valve.

In a second embodiment, the universal rough-in valve of the first embodiment further comprises a fluid mixing valve, wherein the fluid mixing valve comprises a pressure balance valve or a thermostatic valve.

A third embodiment of a universal rough-in valve includes the universal rough-in valve of any of the prior embodiments, wherein the valve manifold includes a first manifold inlet, a second manifold inlet, and a first manifold outlet.

In a fourth embodiment, a universal rough-in valve comprises the rough-in valve of the third embodiment, wherein the first manifold inlet is co-axial with the first valve inlet.

In a fifth embodiment, a universal rough-in valve comprises the rough-in valve of the third embodiment, wherein the second manifold inlet is co-axial with the second valve inlet.

In a sixth embodiment, a universal rough-in valve comprises the rough-in valve of the third embodiment, wherein the first manifold outlet is co-axial with the first valve outlet.

In a seventh embodiment, a universal rough-in valve comprises the rough-in valve of the third embodiment, wherein the valve manifold includes a groove configured to receive a gasket, the gasket configured to form a seal with an internal wall of the valve chamber.

In an eighth embodiment, a universal rough-in valve comprises the rough-in valve of the seventh embodiment, wherein the groove extends around an exterior of the valve manifold.

In a ninth embodiment, a universal rough-in valve comprises the rough-in valve of the seventh embodiment, wherein the gasket comprises a plurality of rings, each of the plurality of rings connected to another of the plurality of rings by a strut.

In a tenth embodiment, a universal rough-in valve comprises the rough-in valve of the ninth embodiment, wherein the plurality of rings are configured to encircle the first manifold inlet, the second manifold inlet, and the first manifold outlet.

In an eleventh embodiment, a universal rough-in valve comprises the rough-in valve of the third embodiment, wherein the valve manifold includes a second manifold outlet.

In a twelfth embodiment, a universal rough-in valve comprises the rough-in valve of the eleventh embodiment, wherein the first manifold outlet is in fluid communication with the second manifold outlet.

In a thirteenth embodiment, a universal rough-in valve comprises the rough-in valve of the eleventh embodiment, wherein the valve manifold includes an outlet passageway comprising the first manifold outlet and the second manifold outlet, the outlet passageway including a central portion having a smaller cross-sectional diameter than at least one of the first manifold outlet and the second manifold outlet.

In a fourteenth embodiment, a universal rough-in valve comprises the rough-in valve of the any of the first through third embodiments, wherein the valve manifold is positioned at least partially between the fluid mixing valve and the valve chamber.

In a fifteenth embodiment, a universal rough-in valve comprises the rough-in valve of the third embodiment, wherein the valve manifold includes a cavity configured to receive the fluid mixing valve, a first transition fluidly connecting the cavity and the first manifold inlet, and a second transition fluidly connecting the cavity and the second manifold inlet.

In a sixteenth embodiment, a universal rough-in valve comprises the rough-in valve of the fifteenth embodiment, wherein the first transition is transverse to the first manifold inlet.

In a seventeenth embodiment, a universal rough-in valve comprises the rough-in valve of the fifteenth embodiment, wherein the second transition is transverse to the second manifold inlet.

In an eighteenth embodiment, a universal rough-in valve comprises the rough-in valve of the fifteenth embodiment, wherein the valve manifold includes a first channel fluidly connecting the cavity and the first manifold outlet.

In a nineteenth embodiment, a universal rough-in valve comprises the rough-in valve of the eighteenth embodiment, wherein the first transition is positioned closer to a center of the valve manifold than the first channel.

In a twentieth embodiment, a universal rough-in valve comprises the rough-in valve of the third embodiment, wherein the valve manifold includes a sidewall defining a cavity configured to receive the fluid mixing valve, a first transition fluidly connecting the cavity and the first manifold inlet, and a second transition fluidly connecting the cavity and the second manifold inlet.

In a twenty-first embodiment, a universal rough-in valve comprises the rough-in valve of the twentieth embodiment, wherein the first transition and the second transition are at least partially formed within the sidewall.

In a twenty-second embodiment, a universal rough-in valve comprises the rough-in valve of the twentieth embodiment, wherein the first transition is fluidly connected to the cavity at a first entry, the second transition is fluidly connected to the cavity at a second entry, and the first entry is positioned below the second entry.

In a twenty-third embodiment, a universal rough-in valve comprises the rough-in valve of the twentieth embodiment, wherein the first transition extends through an exterior of the sidewall such that a portion of the first transition is defined by the sidewall and the valve chamber.

In a twenty-fourth embodiment, a universal rough-in valve comprises the rough-in valve of the twentieth embodiment, wherein the valve manifold includes a first channel fluidly connecting the cavity and the first manifold outlet.

In a twenty-fifth embodiment, a universal rough-in valve comprises the rough-in valve of the twenty-fourth embodiment, wherein the first channel is positioned closer to a center of the valve manifold than the first transition.

In a twenty-sixth embodiment, a universal rough-in valve comprises the rough-in valve of the twentieth embodiment, wherein the sidewall includes a plurality of depressions.

In a twenty-seventh embodiment, a universal rough-in valve comprises the rough-in valve of the twentieth embodiment, wherein the valve manifold includes a notch configured to receive a protrusion on the fluid mixing valve to couple the valve manifold to the fluid mixing valve.

In a twenty-eighth embodiment, a universal rough-in valve comprises:
 a valve chamber defined by a chamber wall;
 a first valve inlet configured to provide a pathway for fluid from a first supply line to the valve chamber;
 a second valve inlet configured to provide a pathway for fluid from a second supply line to the valve chamber;
 a first valve outlet configured to provide a pathway for fluid from the valve chamber to a first outlet line;
 a valve manifold removably received within the valve chamber;
 a pressure balance valve coupled to the valve manifold, the pressure balance fluidly connected to the first valve inlet, the second valve inlet, and the first valve outlet,
 wherein fluid is configured to flow from the first valve inlet and the second valve inlet through the pressure balance valve and between the pressure balance valve and the chamber wall as the fluid flows to the first valve outlet.

In a twenty-ninth embodiment, a universal rough-in valve comprises:
 a valve chamber configured to receive either a pressure balance valve or a thermostatic valve;
 a first inlet configured to provide a pathway for fluid from a first supply line to the valve chamber, the first inlet extending along a first inlet axis;
 a second inlet configured to provide a pathway for fluid from a second supply line to the valve chamber, the second inlet extending along a second inlet axis;

a first outlet extending along a first outlet axis, the first outlet configured to provide a pathway for fluid from the valve chamber to a first outlet line,
wherein the first inlet axis and the second inlet axis are configured to provide a generally straight pathway for fluid between the first supply line and the second supply line.

In a thirtieth embodiment, a universal rough-in valve comprises the rough-in valve of the twenty-ninth embodiment, and further comprises a second outlet configured to provide a pathway for fluid from the valve chamber to a second outlet line, the second outlet extending along a second outlet axis coplanar with the first inlet axis, the second inlet axis, and the first outlet axis.

In a thirty-first embodiment, a universal rough-in valve comprises the rough-in valve of the twenty-ninth embodiment, and further comprises a first service stop moveable between a flow position wherein fluid can flow through the first inlet and a blocking position wherein the flow of fluid through the first inlet is prevented.

In a thirty-second embodiment, a universal rough-in valve comprises the rough-in valve of the thirty-first embodiment, wherein the service stop is configured to be rotated between the flow position and the blocking position.

In a thirty-third embodiment, a universal rough-in valve comprises the rough-in valve of the thirty-second embodiment, wherein the first inlet includes a service stop opening configured to receive the first service stop.

In a thirty-fourth embodiment, a universal rough-in valve comprises the rough-in valve of the thirty-third embodiment, wherein the first service stop includes a cap configured to threadingly engage the service stop opening to moveably secure the first service stop to the universal rough-in valve.

In a thirty-fifth embodiment, a universal rough-in valve comprises the rough-in valve of the thirty-fourth embodiment, wherein the cap includes an aperture, and
wherein the first service stop includes a stem configured to extend into the aperture.

In a thirty-sixth embodiment, a universal rough-in valve comprises the rough-in valve of the thirty-fifth embodiment, wherein the stem and cap are each rotatable relative to the universal rough-in valve.

In a thirty-seventh embodiment, a universal rough-in valve comprises the rough-in valve of the thirty-sixth embodiment, wherein the stem and cap are rotatable relative to the universal rough-in valve independently of one another.

In a thirty-eighth embodiment, a universal rough-in valve comprises the rough-in valve of the thirty-fifth embodiment, wherein the cap is configured to translate along a service stop axis as the cap is rotated.

In a thirty-ninth embodiment, a universal rough-in valve comprises the rough-in valve of the thirty-eighth embodiment, wherein the service stop is axially fixed when the stem is rotated.

In a fortieth embodiment, a universal rough-in valve comprises the rough-in valve of the thirty-fifth embodiment, wherein the stem includes a rim configured to engage a lower portion of the cap.

In a forty-first embodiment, a universal rough-in valve comprises the rough-in valve of the thirty-fifth embodiment, wherein the service stop includes a boot configured to receive at least a portion of the stem, wherein the boot is configured to occlude the first inlet when the service stop is in the blocking position.

In a forty-second embodiment, a universal rough-in valve comprises the rough-in valve of the forty-first embodiment, wherein an opening extends through the boot and the stem such that fluid can flow through the boot and the stem when the service stop is in the flow position.

In a forty-third embodiment, a universal rough-in valve comprises the rough-in valve of the forty-first embodiment, wherein the boot includes a plurality of gaskets configured to provide a fluid seal with a sidewall of the service stop opening.

In a forty-fourth embodiment, a universal rough-in valve comprises the rough-in valve of the forty-third embodiment, wherein one of the plurality of gaskets is adjacent the rim of the stem such that as the cap is rotated relative to the universal rough-in valve the rim moves the one of the plurality of gaskets into contact with another of the plurality of gaskets.

In a forty-fifth embodiment, a universal rough-in valve comprises the rough-in valve of the forty-first embodiment, wherein the boot includes a flat bottom configured to abut a bottom surface of the first inlet.

In a forty-sixth embodiment, a universal rough-in valve comprises the rough-in valve of the thirty-fifth embodiment, wherein the cap is configured to be rotated by a first tool and the stem is configured to be rotated by a second tool, wherein the first tool is different from the second tool.

In a forty-seventh embodiment, a universal rough-in valve comprises the rough-in valve of the twenty-ninth embodiment, wherein the first inlet axis and the second inlet axis are coaxial.

In a forty-eighth embodiment, a universal rough-in valve comprises the rough-in valve of the twenty-ninth embodiment and further comprises a plug configured to be coupled to and prevent the flow of fluid through one of the first outlet and the second outlet.

In a forty-ninth embodiment, a universal rough-in valve comprises the rough-in valve of the twenty-ninth embodiment, wherein the first inlet axis, the second inlet axis, and the first outlet axis are parallel.

In a fiftieth embodiment, a universal rough-in valve comprises the rough-in valve of the twenty-ninth embodiment, wherein the first inlet axis and the second inlet axis are co-axial.

In a fifty-first embodiment, a universal rough-in valve comprises the rough-in valve of the twenty-ninth embodiment, wherein the first inlet axis, the second inlet axis, and the first outlet axis are co-planar.

In a fifty-second embodiment, a universal rough-in valve comprises:
a valve chamber configured to receive a fluid mixing valve;
a first valve inlet configured to provide a pathway for fluid from a first supply line to the valve chamber;
a second valve inlet configured to provide a pathway for fluid from a second supply line to the valve chamber;
a first valve outlet configured to provide a pathway for fluid from the valve chamber to a first outlet line; and
a guide configured to couple the universal rough-in valve to a surface of a wall for a plurality of distances between the universal rough-in valve and the surface of the wall.

In a fifty-third embodiment, a universal rough-in valve comprises the rough-in valve of the fifty-second embodiment, wherein the universal rough-in valve includes a receiver configured to engage the guide to couple the guide to the universal rough-in valve.

In a fifty-fourth embodiment, a universal rough-in valve comprises the rough-in valve of the fifty-second embodiment, wherein the guide includes a face with a plurality of tabs extending from the face, the tabs configured to align the guide within a wall opening.

In a fifty-fifth embodiment, a universal rough-in valve comprises the rough-in valve of the fifty-second embodiment, wherein the plurality of tabs are arranged in a circular pattern.

In a fifty-sixth embodiment, a universal rough-in valve comprises the rough-in valve of the fifty-third embodiment, wherein the guide includes a first opening configured to be selectively aligned with the receiver when the universal rough-in valve is to be positioned within a wall having a first thickness, wherein the guide includes a second opening configured to be selectively aligned with the receiver when the universal rough-in valve is to be positioned within a wall having a second thickness, and wherein the first thickness is less than the second thickness.

In a fifty-seventh embodiment, a universal rough-in valve comprises the rough-in valve of the fifty-sixth embodiment, wherein the guide includes a sleeve extending from a rear surface of the guide.

In a fifty-eighth embodiment, a universal rough-in valve comprises the rough-in valve of the fifty-seventh embodiment, wherein the sleeve is configured to engage the receiver, thereby aligning the guide with the universal rough-in valve.

In a fifty-ninth embodiment, a universal rough-in valve comprises the rough-in valve of the fifty-seventh embodiment, wherein the sleeve includes an extension configured to engage an outer surface of the receiver.

In a sixtieth embodiment, a universal rough-in valve comprises the rough-in valve of the fifty-ninth embodiment, wherein an end of the sleeve engages a receiver face and the extension engages a receiver sidewall.

In a sixty-first embodiment, a universal rough-in valve comprises the rough-in valve of the fifty-ninth embodiment, wherein the extension comprises a semi-circular extension.

In a sixty-second embodiment, a universal rough-in valve comprises the rough-in valve of the sixtieth embodiment, wherein the extension comprises a prong having a shaft configured to be positioned adjacent the receiver sidewall and a shoulder configured to be positioned adjacent a receiver rear face when the guide is coupled to the universal rough-in valve.

In a sixty-third embodiment, a universal rough-in valve comprises the rough-in valve of the sixty-second embodiment, wherein the prong includes a sloped surface configured to cause the prong to flex outwardly as the receiver contacts the sloped surface.

In a sixty-fourth embodiment, a universal rough-in valve comprises the rough-in valve of the sixty-second embodiment, wherein the prong includes a frangible portion such that the guide may be detached from the universal rough-in valve by fracturing the prong.

In a sixty-fifth embodiment, a universal rough-in valve comprises the rough-in valve of the sixty-fourth embodiment, wherein the frangible portion is configured to be fractured by applying a force to the guide in a direction away from the universal rough-in valve.

In a sixty-sixth embodiment, a universal rough-in valve comprises the rough-in valve of the sixty-fifth embodiment, wherein the guide includes a projection configured to selectively engage the receiver.

In a sixty-seventh embodiment, a universal rough-in valve comprises the rough-in valve of the sixty-sixth embodiment, wherein the projection extends from the face of the guide further than the sleeve extends from the face of the guide.

In a sixty-eighth embodiment, a universal rough-in valve comprises the rough-in valve of the fifty-second embodiment, wherein the guide is detachably coupled to the universal rough-in valve.

In a sixty-ninth embodiment, a universal rough-in valve comprises the rough-in valve of the fifty-second embodiment, wherein the guide includes a sidewall having a plurality of recesses, each of the plurality of recesses configured to receive one of the first valve inlet, the second valve inlet, and the first valve outlet.

In a seventieth embodiment, a universal rough-in valve comprises the rough-in valve of the sixty-ninth embodiment, wherein one of the plurality of recess has a height that is different than another of the plurality of recesses.

In a seventy-first embodiment, a universal rough-in valve comprises the rough-in valve of the fifty-second embodiment, and further comprises a fastener coupled to the guide, the fastener configured to engage a sidewall of a wall opening to secure the guide to the wall.

In a seventy-second embodiment, a universal rough-in valve comprises the rough-in valve of the seventy-first embodiment, wherein the fastener includes a body and a head, at least one of the body and the head defining a tool engagement feature such that the fastener may be moved relative to the guide by a tool.

In a seventy-third embodiment, a universal rough-in valve comprises the rough-in valve of the seventy-second embodiment, wherein the head includes a serrated edge.

In a seventy-fourth embodiment, a universal rough-in valve comprises the rough-in valve of the seventy-second embodiment, wherein the head is configured to engage the sidewall of the wall opening at an engagement point and the head includes a cam surface such that rotation of the fastener about a fastener axis changes the distance between the fastener axis and the engagement point.

It will be appreciated by those skilled in the art that changes could be made to the exemplary embodiments shown and described above without departing from the broad inventive concepts thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and various features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the methods of the present invention do not rely on the particular order of steps set forth herein, the particular order of the steps should not be construed as limitation on the claims. Any claims directed to the methods of the present invention should not be limited to the performance of their steps in the order written, and one skilled in the art can readily appreciate that the steps may be varied and still remain within the spirit and scope of the present invention.

The invention claimed is:

1. A valve manifold configured to be removably positioned in a universal rough-in valve chamber and to receive a fluid mixing valve, comprising
 a first manifold inlet, a second manifold inlet, a first manifold outlet, and a second manifold outlet; and
 an outlet passageway comprising the first manifold outlet and the second manifold outlet, the outlet passageway including a central portion having a smaller cross-sectional diameter than the first manifold outlet and the second manifold outlet,
 wherein
 the first manifold outlet and the second manifold outlet comprise a circular cross-section and the central portion comprises a rectangular cross-section,
 the first manifold outlet and the second manifold outlet are co-axial, and
 the outlet passageway including the central portion having the smaller cross-sectional diameter than at least one of the first manifold outlet and the second manifold outlet is configured to receive a venturi.

2. The valve manifold of claim 1, wherein
 the outlet passageway comprises a venturi,
 the venturi comprises a first portion having a first cross-sectional area, and a second portion having a second cross-sectional area,
 the venturi first portion comprises a frustoconical shape and the venturi second portion comprises a rectangular cross-section,
 the second cross-sectional area is smaller than the first cross-sectional area, and
 the venturi first portion is configured to be positioned in the first manifold outlet.

3. The valve manifold of claim 1, comprising a cavity configured to receive the fluid mixing valve, a first transition fluidly connecting the cavity and the first manifold inlet, and a second transition fluidly connecting the cavity and the second manifold inlet.

4. The valve manifold of claim 3, comprising the fluid mixing valve positioned in the cavity, the fluid mixing valve comprising a pressure balance valve or a thermostatic valve.

5. The valve manifold of claim 4, wherein the valve manifold is positioned at least partially between the fluid mixing valve and the rough-in valve chamber.

6. The valve manifold of claim 1, comprising a notch configured to receive a protrusion on the fluid mixing valve to couple the valve manifold to the fluid mixing valve.

7. The valve manifold of claim 1, wherein the first manifold inlet is configured to be co-axial with a rough-in valve first inlet configured to provide a pathway for fluid from a first supply line to the rough-in valve chamber.

8. The valve manifold of claim 1, wherein the second manifold inlet is configured to be co-axial with a rough-in valve second inlet configured to provide a pathway for fluid from a second supply line to the rough-in valve chamber.

9. The valve manifold of claim 1, wherein the first manifold outlet is configured to be co-axial with a rough-in valve first outlet configured to provide a pathway for fluid from the rough-in valve chamber to a first outlet line.

10. The valve manifold of claim 1, comprising a groove configured to receive a gasket, the gasket configured to form a seal with an internal wall of the rough-in valve chamber.

11. The valve manifold of claim 10, wherein the gasket comprises a plurality of rings connected by a strut.

12. The valve manifold of claim 2, wherein the venturi is configured to extend from the first manifold outlet toward or to the second manifold outlet.

13. The valve manifold of claim 12, wherein the manifold is symmetrical about a plane bisecting the first manifold inlet and the second manifold inlet, and/or about a plane bisecting the first manifold outlet and the second manifold outlet.

14. The valve manifold of claim 3, wherein the first transition is transverse to the first manifold inlet.

15. The valve manifold of claim 3, wherein the second transition is transverse to the second manifold inlet.

16. The valve manifold of claim 3, comprising a first channel fluidly connecting the cavity and the first manifold outlet, wherein the first transition is positioned closer to a center of the valve manifold than is the first channel.

17. The valve manifold of claim 3, comprising a sidewall defining the cavity, wherein the first transition and the second transition are at least partially formed within the sidewall.

18. The valve manifold of claim 17, wherein the first transition is fluidly connected to the cavity at a first entry, the second transition is fluidly connected to the cavity at a second entry, and the first entry is positioned below the second entry.

19. The valve manifold of claim 17, wherein the first transition extends through an exterior of the sidewall such that a portion of the first transition is defined by the sidewall and the rough-in valve chamber.

20. The valve manifold of claim 17, comprising a first channel fluidly connecting the cavity and the first manifold outlet, wherein the first channel is positioned closer to a center of the valve manifold than is the first transition.

* * * * *